US008503703B2

(12) United States Patent
Eaton et al.

(10) Patent No.: US 8,503,703 B2
(45) Date of Patent: Aug. 6, 2013

(54) HEARING AID SYSTEMS

(75) Inventors: Anthony M. Eaton, Hartley Wintney (GB); Jerome Charles Ruzicka, Plymouth, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 11/212,406

(22) Filed: Aug. 26, 2005

(65) Prior Publication Data

US 2005/0283263 A1 Dec. 22, 2005

Related U.S. Application Data

(63) Continuation of application No. 09/492,913, filed on Jan. 20, 2000, now abandoned.

(51) Int. Cl.
*H04R 25/00* (2006.01)

(52) U.S. Cl.
USPC ................................ 381/312; 381/60; 700/94

(58) Field of Classification Search
USPC .... 381/60, 312, 314–315, 373, 321; 600/599, 600/559; 73/585; 455/412.1, 466
See application file for complete search history.

(56) References Cited

U.S. PATENT DOCUMENTS

| | | | |
|---|---|---|---|
| 3,527,901 | A | 9/1970 | Geib |
| 4,188,667 | A | 2/1980 | Graupe et al. |
| 4,366,349 | A | 12/1982 | Adelman |
| 4,396,806 | A | 8/1983 | Anderson |
| 4,419,544 | A | 12/1983 | Adelman |
| 4,425,481 | A | 1/1984 | Mansgold et al. |
| 4,471,490 | A | 9/1984 | Bellafiore |
| 4,548,082 | A | 10/1985 | Engebretson et al. |
| 4,606,329 | A | 8/1986 | Hough |
| 4,617,429 | A | 10/1986 | Bellafiore |
| 4,628,907 | A | 12/1986 | Epley |
| 4,634,815 | A | 1/1987 | Marquis |
| 4,636,876 | A | 1/1987 | Schwartz |
| 4,637,402 | A | 1/1987 | Adelman |
| 4,652,702 | A | 3/1987 | Yoshii |
| 4,657,106 | A | 4/1987 | Hardt |
| 4,680,799 | A | 7/1987 | Henneberger |
| 4,682,248 | A | 7/1987 | Schwartz |
| 4,689,820 | A | 8/1987 | Kopke et al. |

(Continued)

FOREIGN PATENT DOCUMENTS

| | | |
|---|---|---|
| AU | 2007216810 | 7/2011 |
| DE | 4339898 | 11/1993 |

(Continued)

OTHER PUBLICATIONS

"Hi-Pro Hearing Instrument Programmer", *GN Otometrics A/S*, (Dec. 2000), 12 pgs.

(Continued)

*Primary Examiner* — Lao Lun-See
(74) *Attorney, Agent, or Firm* — Schwegman Lundberg & Woessner, P.A.

(57) ABSTRACT

Systems, structures, and methods are provided to fit, program, or upgrade a hearing aid system to a patient. One embodiment includes the use of a mobile device to interact with the hearing aid system through a short-range network. The mobile device is also adapted to communicate with a server through a long-range wireless network. The server may reside on the Internet.

40 Claims, 12 Drawing Sheets

U.S. PATENT DOCUMENTS 4,706,778 A 11/1987 Topholm
4,712,245 A 12/1987 Lyregaard
4,731,850 A 3/1988 Levitt et al.
4,735,759 A 4/1988 Bellafiore
4,755,889 A 7/1988 Schwartz
4,756,312 A 7/1988 Epley
4,760,778 A 8/1988 Simelunas et al.
4,763,752 A 8/1988 Haertl et al.
4,776,322 A 10/1988 Hough et al.
4,791,672 A 12/1988 Nunley et al.
4,800,982 A 1/1989 Carlson
4,811,402 A 3/1989 Ward
4,815,138 A 3/1989 Diethelm
4,817,609 A 4/1989 Perkins et al.
4,834,211 A 5/1989 Bibby et al.
4,867,267 A 9/1989 Carlson
4,869,339 A 9/1989 Barton
4,870,688 A 9/1989 Voroba et al.
4,870,689 A 9/1989 Weiss
4,879,749 A 11/1989 Levitt et al.
4,879,750 A 11/1989 Nassler
4,880,076 A 11/1989 Ahlberg et al.
4,882,762 A 11/1989 Waldhauer
4,887,299 A 12/1989 Cummins et al.
4,920,570 A 4/1990 West et al.
4,937,876 A 6/1990 Biermans
4,947,432 A 8/1990 Topholm
4,953,215 A 8/1990 Weiss et al.
4,961,230 A 10/1990 Rising
4,962,537 A 10/1990 Basel et al.
4,966,160 A 10/1990 Birck et al.
4,972,487 A 11/1990 Mangold et al.
4,972,488 A 11/1990 Weiss et al.
4,972,492 A 11/1990 Tanaka et al.
4,975,967 A 12/1990 Rasmussen
4,977,976 A 12/1990 Major
4,989,251 A 1/1991 Mangold
5,002,151 A 3/1991 Oliveira et al.
5,003,607 A 3/1991 Reed
5,003,608 A 3/1991 Carlson
5,008,943 A 4/1991 Arndt et al.
5,012,520 A 4/1991 Steeger
5,014,016 A 5/1991 Anderson
5,016,280 A 5/1991 Engebretson et al.
5,027,410 A 6/1991 Williamson et al.
5,033,090 A 7/1991 Weinrich
5,044,373 A 9/1991 Northeved et al.
5,046,580 A 9/1991 Barton
5,048,077 A 9/1991 Wells et al.
5,048,092 A 9/1991 Yamagishi et al.
5,061,845 A 10/1991 Pinnavaia
5,068,902 A 11/1991 Ward
5,083,312 A 1/1992 Newton et al.
5,101,435 A 3/1992 Carlson
5,111,419 A 5/1992 Morley, Jr. et al.
5,133,016 A 7/1992 Clark
5,142,587 A 8/1992 Kobayashi
5,144,674 A 9/1992 Meyer et al.
5,146,051 A 9/1992 Hermann
5,166,659 A 11/1992 Navarro
5,185,802 A 2/1993 Stanton
5,195,139 A 3/1993 Gauthier
5,197,332 A 3/1993 Shennib
5,201,007 A 4/1993 Ward et al.
5,202,927 A 4/1993 Topholm
5,208,867 A 5/1993 Stites, III
5,210,803 A 5/1993 Martin et al.
5,220,612 A 6/1993 Tibbetts et al.
5,222,151 A 6/1993 Nagayoshi et al.
5,225,836 A 7/1993 Morley, Jr. et al.
5,226,086 A * 7/1993 Platt ................................ 381/58
5,257,315 A 10/1993 Haertl et al.
5,259,032 A 11/1993 Perkins et al.
5,276,739 A 1/1994 Krokstad et al.
5,277,694 A 1/1994 Leysieffer et al.
5,282,253 A 1/1994 Konomi
5,295,191 A 3/1994 Van Vroenhoven
5,298,692 A 3/1994 Ikeda et al.
5,303,305 A 4/1994 Raimo et al.
5,303,306 A 4/1994 Brillhart et al.
5,319,163 A 6/1994 Scott
5,321,757 A 6/1994 Woodfill, Jr.
5,327,500 A 7/1994 Campbell
5,338,287 A 8/1994 Miller et al.
5,343,319 A 8/1994 Moore
5,345,509 A 9/1994 Hofer et al.
5,347,477 A 9/1994 Lee
5,357,251 A 10/1994 Morley, Jr. et al.
5,357,576 A 10/1994 Arndt
5,363,444 A 11/1994 Norris
5,365,593 A 11/1994 Greenwood et al.
5,373,149 A 12/1994 Rasmussen
5,373,555 A 12/1994 Norris et al.
5,381,484 A 1/1995 Claes et al.
5,384,852 A 1/1995 Scharen
5,387,875 A 2/1995 Tateno
5,388,248 A 2/1995 Robinson et al.
5,390,254 A 2/1995 Adelman
5,395,168 A 3/1995 Leenen
5,402,494 A 3/1995 Flippe et al.
5,402,496 A 3/1995 Soli et al.
5,404,407 A 4/1995 Weiss
5,406,619 A 4/1995 Akhteruzzaman et al.
5,416,847 A 5/1995 Boze
5,418,524 A 5/1995 Fennell
5,420,930 A 5/1995 Shugart, III
5,422,855 A 6/1995 Eslick et al.
5,425,104 A 6/1995 Shennib
5,434,924 A 7/1995 Jampolsky
5,440,449 A 8/1995 Scheer
5,445,525 A 8/1995 Broadbent et al.
5,448,637 A 9/1995 Yamaguchi et al.
5,475,759 A 12/1995 Engebretson
5,479,522 A 12/1995 Lindemann et al.
5,481,616 A 1/1996 Freadman
5,487,161 A 1/1996 Koenck et al.
5,488,668 A 1/1996 Waldhauer
5,500,901 A 3/1996 Geraci et al.
5,500,902 A 3/1996 Stockham, Jr. et al.
5,502,769 A 3/1996 Gilbertson
5,515,424 A 5/1996 Kenney
5,515,443 A 5/1996 Meyer
5,530,763 A 6/1996 Aebi et al.
5,531,787 A 7/1996 Lesinski et al.
5,533,029 A 7/1996 Gardner
5,535,282 A 7/1996 Luca
5,540,597 A 7/1996 Budman et al.
5,544,222 A 8/1996 Robinson et al.
5,546,590 A 8/1996 Pierce
5,553,151 A 9/1996 Goldberg
5,553,152 A 9/1996 Newton
5,555,490 A 9/1996 Carroll
5,559,501 A 9/1996 Barzegar et al.
5,561,446 A 10/1996 Montlick
5,563,400 A 10/1996 Le Roux
5,572,594 A 11/1996 Devoe et al.
5,572,683 A 11/1996 Epolite et al.
5,574,654 A 11/1996 Bingham et al.
5,581,747 A 12/1996 Anderson
5,590,373 A 12/1996 Whitley et al.
5,602,925 A 2/1997 Killion
5,603,096 A 2/1997 Gilhousen et al.
5,604,812 A 2/1997 Meyer
5,606,620 A 2/1997 Weinfurtner
5,606,621 A 2/1997 Reiter et al.
5,615,344 A 3/1997 Corder
5,619,396 A 4/1997 Gee et al.
5,626,629 A 5/1997 Faltys et al.
5,640,490 A 6/1997 Hansen et al.
5,645,074 A 7/1997 Shennib et al.
5,649,001 A 7/1997 Thomas et al.
5,659,621 A 8/1997 Newton
5,664,228 A 9/1997 Mital
5,666,125 A 9/1997 Luxon et al.
5,671,368 A 9/1997 Chan et al.
5,677,948 A 10/1997 Meister
5,696,970 A 12/1997 Sandage et al.

5,696,993 A 12/1997 Gavish
5,708,720 A 1/1998 Meyer
5,710,819 A 1/1998 Topholm et al.
5,710,820 A 1/1998 Martin et al.
5,717,771 A 2/1998 Sauer et al.
5,717,818 A 2/1998 Nejime et al.
5,721,783 A 2/1998 Anderson
5,736,727 A 4/1998 Nakata et al.
5,737,706 A 4/1998 Seazholtz et al.
5,738,633 A 4/1998 Christiansen
5,740,165 A 4/1998 Vannucci
5,751,820 A 5/1998 Taenzer
5,757,933 A 5/1998 Preves et al.
5,784,602 A 7/1998 Glass et al.
5,784,628 A 7/1998 Reneris
5,785,661 A 7/1998 Shennib
5,794,201 A 8/1998 Nejime et al.
5,797,089 A 8/1998 Nguyen
5,800,473 A 9/1998 Faisandier
5,809,017 A 9/1998 Smith et al.
5,812,936 A 9/1998 DeMont
5,812,938 A 9/1998 Gilhousen et al.
5,814,095 A 9/1998 Muller et al.
5,819,162 A 10/1998 Spann et al.
5,822,442 A 10/1998 Agnew et al.
5,824,022 A * 10/1998 Zilberman et al. .............. 607/57
5,825,631 A 10/1998 Prchal
5,825,894 A 10/1998 Shennib
5,827,179 A 10/1998 Lichter et al.
5,835,611 A * 11/1998 Kaiser et al. .................. 381/321
5,842,115 A 11/1998 Dent
5,845,251 A 12/1998 Case
5,852,668 A 12/1998 Ishige et al.
5,861,968 A 1/1999 Kerklaan et al.
5,862,238 A 1/1999 Agnew et al.
5,864,708 A 1/1999 Croft et al.
5,864,813 A 1/1999 Case
5,864,820 A 1/1999 Case
5,870,481 A 2/1999 Dymond et al.
5,878,282 A 3/1999 Mital
5,883,927 A 3/1999 Madsen et al.
5,884,260 A 3/1999 Leonhard
5,887,067 A 3/1999 Costa et al.
5,890,016 A 3/1999 Tso
5,909,497 A 6/1999 Alexandrescu
5,910,997 A 6/1999 Ishige et al.
5,915,031 A 6/1999 Hanright
5,916,174 A 6/1999 Dolphin
5,917,812 A 6/1999 Antonio et al.
5,923,764 A 7/1999 Shennib
5,926,388 A 7/1999 Kimbrough et al.
5,926,500 A 7/1999 Odenwalder
5,929,848 A 7/1999 Albukerk et al.
5,930,230 A 7/1999 Odenwalder et al.
5,956,330 A 9/1999 Kerns
5,960,346 A 9/1999 Holshouser
5,987,513 A 11/1999 Prithviraj et al.
6,002,776 A 12/1999 Bhadkamkar et al.
6,009,311 A 12/1999 Killion et al.
6,009,480 A 12/1999 Pleso
6,016,115 A 1/2000 Heubi
6,016,962 A 1/2000 Nakata et al.
6,021,207 A 2/2000 Puthuff et al.
6,022,315 A * 2/2000 Iliff ............................... 600/300
6,023,570 A 2/2000 Tang et al.
6,032,866 A 3/2000 Knighton et al.
6,035,050 A 3/2000 Weinfurtner et al.
6,041,046 A 3/2000 Scott et al.
6,041,129 A 3/2000 Adelman
6,048,305 A 4/2000 Bauman et al.
6,058,197 A * 5/2000 Delage .......................... 381/314
6,061,431 A 5/2000 Knappe et al.
6,078,675 A 6/2000 Bowen-Nielsen et al.
6,081,629 A 6/2000 Browning
6,084,972 A 7/2000 van Halteren et al.
6,088,339 A 7/2000 Meyer
6,088,465 A 7/2000 Hanright et al.
6,094,492 A * 7/2000 Boesen ......................... 381/312
6,095,820 A 8/2000 Luxon et al.
6,104,822 A 8/2000 Melanson et al.
6,104,913 A 8/2000 McAllister
6,112,103 A * 8/2000 Puthuff ......................... 455/557
6,115,478 A 9/2000 Schneider
6,118,877 A * 9/2000 Lindemann et al. ............ 381/60
6,118,882 A * 9/2000 Haynes ......................... 381/374
6,122,500 A 9/2000 Dent et al.
6,137,889 A 10/2000 Shennib et al.
6,144,748 A 11/2000 Kerns
6,149,605 A 11/2000 Christiansen
6,151,645 A 11/2000 Young et al.
6,157,727 A 12/2000 Rueda
6,167,138 A 12/2000 Shennib
6,181,801 B1 1/2001 Puthuff et al.
6,188,979 B1 2/2001 Ashley
6,198,971 B1 3/2001 Leysieffer
6,201,875 B1 3/2001 Davis et al.
6,205,190 B1 3/2001 Antonio
6,219,427 B1 4/2001 Kates et al.
6,229,900 B1 5/2001 Leenen
6,236,731 B1 5/2001 Brennan et al.
6,240,192 B1 5/2001 Brennan et al.
6,240,193 B1 5/2001 Green
6,240,194 B1 5/2001 De Koning
6,251,062 B1 6/2001 Leysieffer
6,265,102 B1 7/2001 Shrim et al.
6,308,222 B1 10/2001 Krueger et al.
6,317,613 B1 * 11/2001 Brown, Jr. ..................... 455/570
6,320,969 B1 11/2001 Killion
6,323,980 B1 * 11/2001 Bloom .......................... 398/129
6,324,907 B1 12/2001 Halteren et al.
6,330,233 B1 12/2001 Miya et al.
6,334,072 B1 12/2001 Leysieffer
6,336,863 B1 1/2002 Baerlocher et al.
6,347,148 B1 2/2002 Brennan et al.
6,351,472 B1 2/2002 Meyer
6,366,863 B1 4/2002 Bye et al.
6,366,880 B1 4/2002 Ashley
6,377,925 B1 4/2002 Greene, Jr. et al.
6,379,314 B1 * 4/2002 Horn ............................ 600/559
6,389,142 B1 5/2002 Hagen et al.
6,422,471 B2 7/2002 Kowalski
6,424,722 B1 7/2002 Hagen et al.
6,438,245 B1 8/2002 Taenzer et al.
6,449,662 B1 9/2002 Armitage
6,453,051 B1 9/2002 Killion
6,466,678 B1 10/2002 Killion et al.
6,490,427 B2 12/2002 Shields
6,490,627 B1 12/2002 Kalra et al.
6,493,453 B1 12/2002 Glendon
6,545,989 B1 4/2003 Butler
6,554,762 B2 4/2003 Leysieffer
6,557,029 B2 4/2003 Szymansky
6,565,503 B2 5/2003 Leysieffer et al.
6,574,342 B1 6/2003 Davis et al.
6,575,894 B2 6/2003 Leysieffer et al.
6,584,356 B2 6/2003 Wassmund et al.
6,590,986 B1 7/2003 Fazio
6,590,987 B2 7/2003 Delage
6,601,093 B1 7/2003 Peters
6,603,860 B1 8/2003 Taenzer et al.
6,606,391 B2 * 8/2003 Brennan et al. ............... 381/316
6,644,120 B1 11/2003 Braun et al.
6,647,345 B2 11/2003 Bye et al.
6,654,652 B1 11/2003 Dalton et al.
6,658,307 B1 12/2003 Mueller
6,674,867 B2 1/2004 Basseas
6,684,063 B2 1/2004 Berger et al.
6,695,943 B2 2/2004 Juneau et al.
6,697,674 B2 2/2004 Leysieffer
6,704,424 B2 3/2004 Killion
6,707,581 B1 3/2004 Browning
6,717,925 B1 4/2004 Leppisaari et al.
6,738,485 B1 5/2004 Boesen
6,788,790 B1 * 9/2004 Leysieffer ...................... 381/60
6,792,114 B1 9/2004 Kates et al.
6,823,312 B2 11/2004 Mittal et al.
6,850,775 B1 2/2005 Berg
6,851,048 B2 2/2005 Armitage et al.

| | | | | |
|---|---|---|---|---|
| 6,882,628 | B2 | 4/2005 | Nakagawa et al. | |
| 6,888,948 | B2 | 5/2005 | Hagen et al. | |
| 6,895,345 | B2 | 5/2005 | Bye et al. | |
| 6,913,578 | B2 | 7/2005 | Hou | |
| 6,944,474 | B2 | 9/2005 | Rader et al. | |
| 6,974,421 | B1 | 12/2005 | Causevic et al. | |
| 6,978,155 | B2 | 12/2005 | Berg | |
| 7,016,504 | B1 * | 3/2006 | Shennib | 381/60 |
| 7,054,957 | B2 | 5/2006 | Armitage | |
| 7,200,237 | B2 | 4/2007 | Zhang et al. | |
| 7,451,256 | B2 * | 11/2008 | Hagen et al. | 710/72 |
| 7,787,647 | B2 | 8/2010 | Hagen et al. | |
| 7,929,723 | B2 | 4/2011 | Hagen et al. | |
| 8,300,862 | B2 | 10/2012 | Newton et al. | |
| 2001/0003542 | A1 | 6/2001 | Kita | |
| 2001/0004397 | A1 | 6/2001 | Kita et al. | |
| 2001/0007050 | A1 | 7/2001 | Adelman | |
| 2001/0009019 | A1 | 7/2001 | Armitage | |
| 2001/0031996 | A1 | 10/2001 | Leysieffer | |
| 2001/0031999 | A1 | 10/2001 | Carter et al. | |
| 2001/0033664 | A1 | 10/2001 | Poux et al. | |
| 2001/0040873 | A1 | 11/2001 | Nakagawa et al. | |
| 2001/0041602 | A1 | 11/2001 | Berger et al. | |
| 2001/0044668 | A1 | 11/2001 | Kimbrough et al. | |
| 2001/0049466 | A1 | 12/2001 | Leysieffer et al. | |
| 2002/0012438 | A1 | 1/2002 | Leysieffer et al. | |
| 2002/0015506 | A1 | 2/2002 | Aceti et al. | |
| 2002/0026091 | A1 | 2/2002 | Leysieffer | |
| 2002/0029070 | A1 | 3/2002 | Leysieffer et al. | |
| 2002/0043545 | A1 | 4/2002 | Tang | |
| 2002/0048374 | A1 | 4/2002 | Soli et al. | |
| 2002/0076073 | A1 | 6/2002 | Taenzer et al. | |
| 2002/0083235 | A1 | 6/2002 | Armitage | |
| 2002/0094098 | A1 | 7/2002 | Delage | |
| 2002/0095292 | A1 | 7/2002 | Mittl et al. | |
| 2002/0111745 | A1 | 8/2002 | Bye et al. | |
| 2002/0150219 | A1 | 10/2002 | Jorgenson et al. | |
| 2002/0165466 | A1 | 11/2002 | Givens et al. | |
| 2002/0168075 | A1 | 11/2002 | Hagen et al. | |
| 2002/0183648 | A1 | 12/2002 | Hou | |
| 2003/0014566 | A1 | 1/2003 | Armitage | |
| 2003/0064746 | A1 | 4/2003 | Rader et al. | |
| 2003/0128859 | A1 | 7/2003 | Greene et al. | |
| 2003/0144603 | A1 | 7/2003 | Zoth et al. | |
| 2003/0162529 | A1 | 8/2003 | Noblins | |
| 2003/0181201 | A1 * | 9/2003 | Bomze et al. | 455/414.3 |
| 2004/0204921 | A1 | 10/2004 | Bye et al. | |
| 2005/0008175 | A1 | 1/2005 | Hagen et al. | |
| 2005/0196002 | A1 | 9/2005 | Hagen et al. | |
| 2006/0074572 | A1 | 4/2006 | Bye et al. | |
| 2008/0137888 | A1 | 6/2008 | Newton et al. | |
| 2010/0086153 | A1 | 4/2010 | Hagen et al. | |

FOREIGN PATENT DOCUMENTS

| | | | |
|---|---|---|---|
| DE | 19541648 | | 5/1997 |
| DE | 19541648 | A1 | 5/1997 |
| DE | 19600234 | | 7/1997 |
| DE | 19600234 | A1 | 7/1997 |
| DE | 29905172 | | 7/1999 |
| DE | 29905172 | U1 | 7/1999 |
| DE | 19815373 | | 10/1999 |
| DE | 19815373 | A1 | 10/1999 |
| DE | 19916900 | | 9/2000 |
| DE | 19949604 | | 5/2001 |
| DK | 1596633 | T3 | 7/2012 |
| EP | 341902 | | 11/1989 |
| EP | 0341902 | A2 | 11/1989 |
| EP | 341903 | | 11/1989 |
| EP | 342782 | | 11/1989 |
| EP | 363609 | | 4/1990 |
| EP | 381608 | | 8/1990 |
| EP | 448764 | A1 | 10/1991 |
| EP | 537026 | | 4/1993 |
| EP | 0537026 | A2 | 4/1993 |
| EP | 565279 | | 10/1993 |
| EP | 579152 | | 1/1994 |
| EP | 0448764 | B1 | 6/1994 |
| EP | 632609 | | 1/1995 |
| EP | 658035 | | 6/1995 |
| EP | 689755 | | 1/1996 |
| EP | 689755 | A1 | 1/1996 |
| EP | 0726519 | A1 | 8/1996 |
| EP | 742548 | | 11/1996 |
| EP | 763903 | | 3/1997 |
| EP | 765042 | | 3/1997 |
| EP | 789474 | | 8/1997 |
| EP | 796035 | | 9/1997 |
| EP | 800331 | | 10/1997 |
| EP | 805562 | | 11/1997 |
| EP | 823829 | A1 | 2/1998 |
| EP | 831674 | | 3/1998 |
| EP | 853443 | | 7/1998 |
| EP | 0853443 | | 7/1998 |
| EP | 858180 | | 8/1998 |
| EP | 873034 | | 10/1998 |
| EP | 886389 | | 12/1998 |
| EP | 895364 | | 2/1999 |
| EP | 737351 | | 3/1999 |
| EP | 903871 | | 3/1999 |
| EP | 910191 | | 4/1999 |
| EP | 936831 | | 8/1999 |
| EP | 0954146 | A2 | 11/1999 |
| EP | 964603 | | 12/1999 |
| EP | 876717 | | 4/2000 |
| EP | 1191817 | | 3/2002 |
| EP | 878928 | | 8/2002 |
| EP | 1596633 | A2 | 11/2005 |
| EP | 1596633 | B1 | 7/2012 |
| JP | 01318500 | | 12/1989 |
| JP | 10210541 | | 8/1998 |
| JP | 11055219 | | 2/1999 |
| JP | 11133998 | | 5/1999 |
| JP | 11196065 | | 7/1999 |
| JP | 2000287299 | | 10/2000 |
| WO | WO-8404195 | | 10/1984 |
| WO | WO-8601671 | | 3/1986 |
| WO | WO-8701851 | | 3/1987 |
| WO | WO-9103042 | | 3/1991 |
| WO | WO-9422372 | | 3/1994 |
| WO | WO-9425958 | | 11/1994 |
| WO | WO-9513685 | | 5/1995 |
| WO | WO-9515712 | | 6/1995 |
| WO | WO-9602097 | | 1/1996 |
| WO | WO-9626580 | A1 | 8/1996 |
| WO | WO-9637086 | | 11/1996 |
| WO | WO-96/41498 | | 12/1996 |
| WO | WO-9641498 | | 12/1996 |
| WO | WO-9714266 | | 4/1997 |
| WO | WO-9714267 | | 4/1997 |
| WO | WO-9717819 | A1 | 5/1997 |
| WO | WO-9719573 | | 5/1997 |
| WO | WO-9723062 | | 6/1997 |
| WO | WO-9727682 | | 6/1997 |
| WO | WO-9727712 | | 7/1997 |
| WO | WO-9731431 | | 8/1997 |
| WO | WO-9739537 | | 10/1997 |
| WO | WO-9741653 | | 11/1997 |
| WO | WO-9802969 | | 1/1998 |
| WO | WO-9816086 | | 4/1998 |
| WO | WO-9826513 | | 6/1998 |
| WO | WO-9841030 | | 9/1998 |
| WO | WO-9844648 | | 10/1998 |
| WO | WO-9844667 | | 10/1998 |
| WO | WO-9844760 | A2 | 10/1998 |
| WO | WO-9844762 | A1 | 10/1998 |
| WO | WO-9847313 | | 10/1998 |
| WO | WO-9847314 | | 10/1998 |
| WO | WO-98/51124 | | 11/1998 |
| WO | WO-9849785 | | 11/1998 |
| WO | WO-9851124 | | 11/1998 |
| WO | WO-98/54928 | | 12/1998 |
| WO | WO-9854928 | | 12/1998 |
| WO | WO-9855833 | | 12/1998 |
| WO | WO-9856106 | | 12/1998 |
| WO | WO-9901994 | | 1/1999 |
| WO | WO-9904043 | A1 | 1/1999 |
| WO | WO-9907302 | | 2/1999 |
| WO | WO-9908457 | A2 | 2/1999 |

| | | | |
|---|---|---|---|
| WO | WO-9919779 | | 4/1999 |
| WO | WO-9922550 | | 5/1999 |
| WO | WO-9926392 | | 5/1999 |
| WO | WO-9931935 | | 6/1999 |
| WO | WO-9931937 | | 6/1999 |
| WO | WO-9943105 | | 8/1999 |
| WO | WO-9943185 | | 8/1999 |
| WO | WO-9946912 | | 9/1999 |
| WO | WO-9948330 | | 9/1999 |
| WO | WO-9951057 | | 10/1999 |
| WO | WO-9957657 | A1 | 11/1999 |
| WO | WO-0002418 | | 1/2000 |
| WO | WO-0010363 | | 2/2000 |
| WO | WO-00/16590 | | 3/2000 |
| WO | WO-0016590 | | 3/2000 |
| WO | WO-00/21332 | | 4/2000 |
| WO | WO-0019632 | | 4/2000 |
| WO | WO-0022874 | | 4/2000 |
| WO | WO-0036687 | | 6/2000 |
| WO | WO-0036690 | | 6/2000 |
| WO | WO-0036691 | | 6/2000 |
| WO | WO-0036692 | | 6/2000 |
| WO | WO-0128195 | A1 | 4/2001 |
| WO | WO-0135695 | | 5/2001 |
| WO | WO-0135695 | A2 | 5/2001 |
| WO | WO-0139370 | | 5/2001 |
| WO | WO-0145088 | | 6/2001 |
| WO | WO-0151122 | | 7/2001 |
| WO | WO-0154456 | A1 | 7/2001 |
| WO | WO-0154458 | A2 | 7/2001 |
| WO | WO-0169830 | A2 | 9/2001 |
| WO | WO-0176321 | A1 | 10/2001 |
| WO | WO-0193627 | A2 | 12/2001 |
| WO | WO-0197564 | A2 | 12/2001 |
| WO | WO-0209363 | A2 | 1/2002 |
| WO | WO-0209473 | A2 | 1/2002 |
| WO | WO-0230157 | A2 | 4/2002 |
| WO | WO-03063546 | A1 | 7/2003 |

OTHER PUBLICATIONS

"Internet Web Page at http://pw2.netcom.com/~ed13/pcmcia.html", entitled "What is PCMIA", (Nov. 14, 1996),3 pgs.

"Internet Web Page at http://www.microaud.com (May 26, 1999)",17 pgs.

"Internet Web Page at http://www.siemens-hearing.com/products/pprods/persprogmain.htm", entitled "Personal Programmer 2000," (Jul. 1999),3 pgs.

"Internet Web Page at www.hearing-aid.com/microcard.htm", entitled "Microcard PCMIA Programming Interface," (archived Oct. 17, 2002), 2 pgs.

Anderson, Blane A., "A PCMIA Card for Programmable Instrument Applications", *Tech-Topic. reprinted from the Hearing Review*, vol. 4, No.9,(Sep. 1997),47-48.

Armitage, Scott , et al., "Microcard: A new hearing aid programming interface", *Hearing Journal*, 51(9), (Sep. 1998),37-32.

Clancy, David A., "Highlighting developments in hearing aids", *Hearing Instruments*, (Dec. 1995),2.

Eaton, Anthony M., et al., "Hearing Aid Systems", U.S. Appl. No. 09/492,913, filed Jan. 20, 2000 ,56 pgs.

Griffing, Terry S., et al., "Acoustical Efficiency of Canal ITE Aids", *Audecibel*, (Spring 1983),30-31.

Griffing, Terry S., et al., "Custom canal and mini in-the-ear hearing aids", *Hearing Instruments*, vol. 34. No. 2, (Feb. 1983),31-32.

Griffing, Terry S., et al., "How to evaluate, sell, fit and modify canal aids", *Hearing Instruments* , vol. 35. No. 2, (Feb. 1984),3.

Hagen, Lawrence T., "Portable System for Programming Hearing Aids", U.S. Appl. No. 10/842,246, filed May 10, 2004, 53 pgs.

Mahon, William J., "Hearing Aids Get a Presidential Endorsement", *The Hearing Journal*., (Oct. 1983),7-8.

Micro Audiometrics Corporation, "Micro Audiometrics Corporation Web Page", http://www/microaud.com, Internet webpage,(May 26, 1999),11 pgs.

Sullivan, Roy F., "Custom canal and concha hearing instruments: A real ear comparison", *Hearing instruments*, 40(4), (Jul. 1989),5.

Sullivan, Roy F., "Customi canal and concha hearing instruments: A real ear comparison Part II", *Hearing Instruments*, vol. 40, No. 7, (Jul. 1989),6.

U.S. Appl. No. 09/492,913 final office action mailed Apr. 20, 2005, 21 Pgs.

U.S. Appl. No. 09/492,913 final office action mailed Jun. 2, 2006, 24 Pgs.

U.S. Appl. No. 09/492,913 non-final office action mailed Oct. 26, 2005, 21 Pgs.

U.S. Appl. No. 09/492,913 non-final office action mailed Jun. 2, 2004, 15 Pgs.

U.S. Appl. No. 09/492,913 non-final office action mailed Jul. 13, 2007, 20 Pgs.

U.S. Appl. No. 09/492,913 Response filed Nov. 2, 2004 non-final office action mailed Jun. 2, 2004, 24 Pgs.

U.S. Appl. No. 09/492,913 Response filed Feb. 27, 2006 non-final office action mailed Oct. 26, 2005, 26 Pgs.

U.S. Appl. No. 10/096,335 Final Office Action mailed Jul. 15, 2003, 12 pgs.

U.S. Appl. No. 10/096,335 Non Final Office Action mailed Feb. 11, 2004, 7 pgs.

U.S. Appl. No. 10/096,335 Non Final Office Action mailed Oct. 3, 2002, 14 pgs.

U.S. Appl. No. 10/096,335 Notice of allowance mailed Nov. 18, 2004, 16 pgs.

U.S. Appl. No. 10/096,335 Response filed Jan. 14, 2004 to Final Office Action mailed Jul. 15, 2003, 14 pgs.

U.S. Appl. No. 10/096,335 Response filed Apr. 3, 2003 to Non Final Office Action mailed Oct. 3, 2002, 14 pgs.

U.S. Appl. No. 10/096,335 Response filed Jun. 10, 2004 to Non Final Office Action mailed Feb. 11, 2004, 11 pgs.

U.S. Appl. No. 11/036,197 Advisory Action mailed Apr. 3, 2007, 3 pgs.

U.S. Appl. No. 11/036,197 Final Office Action mailed Jan. 23, 2007, 13 pgs.

U.S. Appl. No. 11/036,197 Non Final Office Action mailed Jun. 4, 2007, 11 pgs.

U.S. Appl. No. 11/036,197 Non Final Office Action mailed Aug. 15, 2006, 24 pgs.

U.S. Appl. No. 11/036,197 Response filed Mar. 23, 2007 to Final Office Action mailed Jan. 23, 2007, 10 pgs.

U.S. Appl. No. 11/036,197 Response filed Nov. 15, 2006 to Non Final Office Action mailed Jun. 4, 2007, 9 pgs.

U.S. Appl. No. 11/036,197, Response dated Oct. 4, 2007 to Non-Final Office Action dated Jun. 4, 2007, 8 pages.

"U.S. Appl. No. 09/492,913, Appeal Brief filed Apr. 2, 2007", 38 pgs.

"U.S. Appl. No. 09/492,913, Appeal Brief filed Apr. 14, 2008", 35 pgs.

"U.S. Appl. No. 09/492,913, Preliminary Amendment filed Jan. 20, 2000", 1 pg.

"U.S. Appl. No. 09/492,913, Response filed Mar. 2, 2004 to Restriction Requirement mailed Feb. 2, 2004", 1 pg.

"U.S. Appl. No. 09/492,913, Response to Notification of Non-Compliant Appeal Brief filed May 19, 2008", 2 pgs.

"U.S. Appl. No. 09/492,913, Restriction Requirement mailed Feb. 2, 2004", 4 pgs.

"U.S. Appl. No. 09/795,829, 312 Amendment filed Feb. 21, 2006", 9 pgs.

"U.S. Appl. No. 09/795,829, Preliminary Amendment filed Feb. 28, 2001", 4 pgs.

"U.S. Appl. No. 09/795,829, PTO Response to 312 Amendment mailed Apr. 10, 2006", 2 pgs.

"U.S. Appl. No. 10/096,335, Comments on Statement of Reasons for Allowance filed Dec. 30, 2004", 1 pg.

"U.S. Appl. No. 10/096,335, Preliminary Amendment mailed Mar. 11, 2002", 1 pg.

"U.S. Appl. No. 10/096,335, Supplemental Notice of Allowability mailed Dec. 27, 2004", 3 pgs.

"U.S. Appl. No. 10/241,764, Preliminary Amendment filed Sep. 10, 2002", 2 pgs.

"U.S. Appl. No. 10/698,333, Preliminary Amendment filed Jun. 3, 2004", 6 pgs.

"U.S. Appl. No. 10/698,333, Supplemental Notice of Allowability mailed Feb. 11, 2005", 2 pgs.
"U.S. Appl. No. 10/698,333, Supplemental Notice of Allowability mailed Mar. 1, 2005", 2 pgs.
"U.S. Appl. No. 10/698,333, Supplemental Preliminary Amendment filed Jun. 22, 2004", 6 pgs.
"U.S. Appl. No. 10/842,246, Ex Parte Quayle Action mailed Apr. 3, 2009", 9 pgs.
"U.S. Appl. No. 10/842,246, Non-Final Office Action mailed Nov. 6, 2008", 13 pgs.
"U.S. Appl. No. 10/842,246, Reponse filed Jun. 10, 2009 to Ex parte Quayle Office Action mailed Apr. 3, 2009", 6 pgs.
"U.S. Appl. No. 10/842,246, Response filed Aug. 4, 2008 to Restriction Requirement mailed Jul. 2, 2008", 8 pgs.
"U.S. Appl. No. 10/842,246, Response filed Mar. 6, 2009 to Non-Final Office Action mailed Nov. 6, 2008", 7 pgs.
"U.S. Appl. No. 10/842,246, Restriction Requirement mailed Jul. 2, 2008", 7 pgs.
"U.S. Appl. No. 11/036,197, Advisory Action mailed Mar. 18, 2008", 3 pgs.
"U.S. Appl. No. 11/036,197, Notice of Allowance mailed Jul. 1, 2008", 6 pgs.
"U.S. Appl. No. 11/036,197, Preliminary Amendment mailed Jul. 13, 2005", 5 pgs.
"U.S. Appl. No. 11/036,197, Supplemental Preliminary Amendment filed Jul. 13, 2005", 5 pgs.
"U.S. Appl. No. 11/331,827, Preliminary Amendment filed Jan. 13, 2006", 3 pgs.
"Canadian Application No. 2,396,771, Office Action mailed Oct. 27, 2008", 5 pgs.
Ingrao, B., "Audiology Unplugged: Leading hearing care into the Bluetooth Age", *Hearing Review*, (Jan. 2006), 6 pgs.
"U.S. Appl. No. 10/842,246 Notice of Allowance Mailed Oct. 1, 2009", 8 pgs.
"U.S. Appl. No. 10/842,246, Notice of Allowance mailed Nov. 12, 2009", 9 pgs.
"U.S. Appl. No. 10/842,246, Supplemental Notice of Allowability mailed Oct. 15, 2009", 3 pgs.
"Canadian Application Serial No. 2,223,660, Office Action mailed Feb. 1, 2005", 3 pgs.
"Canadian Application Serial No. 2,223,660, Response to Office Actions mailed May 5, 2008", 17 pgs.
"Canadian Application Serial No. 2,343,986, Office Action mailed May 9, 2007", 2 pgs.
"Canadian Application Serial No. 2,396,771, Office Action mailed Mar. 14, 2007", 7 pgs.
"Canadian Application Serial No. 2,396,771, Response filed Aug. 27, 2007 to Office Action mailed Mar. 14, 2007", 14 pgs.
"Canadian Application Serial No. 2,506,957, Response filed Oct. 14, 2008 to Office Action mailed Apr. 14, 2008", 8 pgs.
"European Application Serial No. 01942849.9, Office Action mailed Jan. 15, 2004", 6 pgs.
"European Application Serial No. 01942849.9, Office Action mailed Aug. 30, 2004", 1 pg.
"European Application Serial No. 01942849.9, Response filed Nov. 1, 2004 to Office Action mailed Aug. 30, 2004", 20 pgs.
"European Application Serial No. 01942849.9, Summons to Attend Oral Proceeding mailed Dec. 15, 2010", 5 Pgs.
"European Application Serial No. 05252864.3, Response filed Jul. 30, 2009 to Office Action mailed Apr. 20, 2009", 3 pgs.
"European Application Serial No. 07253666.7, Office Action mailed Nov. 26, 2010", 8 pgs.
"European Application Serial No. 07253666.7, Response filed Sep. 30, 2009 to Office Action mailed Mar. 27, 2009", 14 pgs.
"European Application Serial No. 07253666.7, Response filed Nov. 15, 2007 to Office Action mailed Nov. 7, 2007", 10 pgs.
"European Application Serial No. 97403015.7, European Search Report mailed Sep. 19, 2001", 3 pgs.
"European Application Serial No. 97403015.7, Office Action mailed May 29, 2007", 5 pgs.
"European Application Serial No. 97403015.7, Response to Office Action mailed May 29, 2007", 8 pgs.
"European Application Serial No. 9951457.3, Response to Office Action mailed Jul. 14, 2004", 1 pgs.
"European Application Serial No. 9951457.3. Response to Office Action mailed Nov. 16, 2005", 21 pgs.
"European Application Serial No. 99951457.3, European Office Action mailed Jul. 14, 2004", 1 pgs.
"European Application Serial No. 99951457.3, European Search Report mailed Jul. 12, 2004", 3 pgs.
"European Application Serial No. 99951457.3, Office Action mailed Sep. 12, 2007", 4 pgs.
"European Application Serial No. 99951457.3, Office Action mailed Nov. 16, 2005", 10 pgs.
"European Application Serial No. 99951457.3, Response to Office Action mailed Mar. 4, 2008", 2 pgs.
"International Application Serial No. PCT/US01/01663, International Preliminary Examination Report mailed Jul. 18, 2002", 8 pgs.
"International Application Serial No. PCT/US01/01663, International Search Report mailed Nov. 19, 2001", 5 pgs.
"International Application Serial No. PCT/US01/01663, Written Opinion mailed May 3, 2002", 9 pgs.
"International Application Serial No. PCT/US99/21188, International Preliminary Examination Report mailed Mar. 27, 2001", 5 pgs.
"International Application Serial No. PCT/US99/21188, International Search Report mailed Dec. 13, 2001", 47 pgs.
"International Application Serial No. PCT/US99/21188, Written Opinion mailed Dec. 15, 2000", 8 pgs.
"U.S. Appl. No. 08/782,328, Non Final Office Action mailed Jul. 7, 1998", 7 pgs.
"U.S. Appl. No. 08/896,484, Advisory Action mailed Jan. 29, 2002", 3 pgs.
"U.S. Appl. No. 08/896,484, Final Office Action mailed May 9, 2000", 7 pgs.
"U.S. Appl. No. 08/896,484, Final Office Action mailed Sep. 10, 2001", 14 pgs.
"U.S. Appl. No. 08/896,484, Non Final Office Action mailed Feb. 28, 2001", 16 pgs.
"U.S. Appl. No. 08/896,484, Non Final Office Action mailed Aug. 10, 1999", 6 pgs.
"U.S. Appl. No. 08/896,484, Non Final Office Action mailed Aug. 30, 2000", 16 pgs.
"U.S. Appl. No. 08/896,484, Notice of Allowance mailed Mar. 26, 2002", 4 pgs.
"U.S. Appl. No. 08/896,484, Response filed Feb. 10, 2000 to Non Final Office Action mailed Aug. 10, 1999", 3 pgs.
"U.S. Appl. No. 08/896,484, Response filed Feb. 11, 2002 to Advisory Action mailed Jan. 11, 2002", 6 pgs.
"U.S. Appl. No. 08/896,484, Response filed Jun. 28, 2001 to Non Final Office Action mailed Feb. 28, 2001", 13 pgs.
"U.S. Appl. No. 08/896,484, Response filed Aug. 3, 2000 to Final Office Action mailed May 9, 2000", 3 pgs.
"U.S. Appl. No. 08/896,484, Response filed Nov. 8, 2001 to Final Office Action mailed Sep. 10, 2001", 12 pgs.
"U.S. Appl. No. 08/896,484, Response filed Nov. 30, 2000 to Non Final Office Action mailed Aug. 30, 2000", 4 pgs.
"U.S. Appl. No. 09/004,788, Examiner Interview Summary mailed Oct. 17, 2000", 1 pg.
"U.S. Appl. No. 09/004,788, Final Office Action mailed Mar. 31, 2000", 5 pgs.
"U.S. Appl. No. 09/004,788, Non Final Office Action mailed Mar. 23, 2001", 8 pgs.
"U.S. Appl. No. 09/004,788, Non Final Office Action mailed Jul. 16, 1999", 10 pgs.
"U.S. Appl. No. 09/004,788, Notice of Allowance mailed Oct. 2, 2001", 7 pgs.
"U.S. Appl. No. 09/004,788, Preliminary Amendment mailed Sep. 29, 2000", 6 pgs.
"U.S. Appl. No. 09/004,788, Response filed Jun. 25, 2001 to Non Final Office Action mailed Mar. 23, 2001", 7 pgs.
"U.S. Appl. No. 09/492,913, Examiner's Answer to Appeal Brief mailed Aug. 19, 2010", 11 pgs.
"U.S. Appl. No. 09/492,913, Request for Rehearing filed Oct. 19, 2010", 11 pgs.

"U.S. Appl. No. 10/112,965, Advisory Action mailed Apr. 17, 2003", 2 pgs.
"U.S. Appl. No. 10/112,965, Final Office Action mailed Jan. 27, 2003", 11 pgs.
"U.S. Appl. No. 10/112,965, Non Final Office Action mailed Sep. 23, 2002", 11 pgs.
"U.S. Appl. No. 10/112,965, Notice of Allowance mailed Jun. 6. 2003", 5 pgs.
"U.S. Appl. No. 10/112,965, Response filed Mar. 27, 2003 to Final Office Action mailed Jan. 27, 2003", 7 pgs.
"U.S. Appl. No. 10/112,965, Response filed Nov. 19, 2002 to Non Final Office Action mailed Sep. 23, 2002", 6 pgs.
"U.S. Appl. No. 10/842,246, 312 Amendment filed Nov. 30, 2009", 5 pgs.
"U.S. Appl. No. 10/842,246, Advisory Action mailed Jul. 20, 2009", 3 pgs.
"U.S. Appl. No. 10/842,246, Examiner Interview Summary filed Sep. 9, 2009", 1 pg.
"U.S. Appl. No. 10/842,246, Examiner Interview Summary mailed Jun. 30. 2009", 2 pgs.
"U.S. Appl. No. 10/842,246, Notice of Allowance mailed Mar. 24, 2010", 7 pgs.
"U.S. Appl. No. 11/857,283, Final Office Action mailed May 12, 2010", 13 pgs.
"U.S. Appl. No. 11/857,283, Non-Final Office Action mailed Sep. 24, 2010", 11 pgs.
"U.S. Appl. No. 11/857,283, Non-Final Office Action mailed Oct. 8, 2009", 14 pgs.
"U.S. Appl. No. 11/857,283, Response filed Feb. 8, 2010 to Non Final Office Action mailed Oct. 8, 2009", 12 pgs.
"U.S. Appl. No. 11/857,283, Response filed Sep. 13, 2010 to Final Office Action mailed May 12, 2010", 8 pgs.
"U.S. Appl. No. 11/857,283, Response filed Dec. 23, 2010 to Non Final Office Action mailed Sep. 24, 2010", 9 pgs.
"U.S. Appl. No. 12/553,857, Non-Final Office Action mailed Sep. 29. 2010", 6 pgs.
"U.S. Appl. No. 12/553,857, Notice of Allowance mailed Dec. 13, 2010", 7 pgs.
"U.S. Appl. No. 12/553,857, Preliminary Amendment filed Dec, 18, 2009", 5 pgs.
"U.S. Appl. No. 12/553,857, Response filed Nov. 11, 2010 to Non Final Office Action mailed Sep. 29, 2010", 6 pgs.
"Australian Application No. 2007216810 , First Examiner Report mailed May, 27, 2010", 2 Pgs.
"Canadian Application No. 2601662, Office Action Mailed Feb. 8, 2010", 5 pgs.
"Canadian Application Serial No. 2,343,986, Office Action Mailed Dec. 12, 2008", 2 pgs.
"Canadian Application No. 2,506,957, Office Action mailed Apr. 14, 2008", 3 pgs.
"Canadian Application No. 2223660, Office Action mailed May 5, 2008", 5 pgs.
"Canadian Application No. 2601662, Office Action Response Filed Aug. 17, 2010", 9 pgs.
"European Application No. 05252864.3, Office Action mailed Apr. 29, 2009", 4 pgs.
"European Application No. 05252864.3, Office Action mailed Oct. 13, 2008", 4 pgs.
"European Application No. 07253666.7, European Search Report mailed Oct. 10, 2008", 7 pgs.
"European Application No. 07253666.7, Office Action Mailed Mar. 27, 2009", 1 pg.
"European Application No. 07253666.7, Office Action mailed Nov. 26, 2010", 8 pgs.
"European Application No. 97403015.7, Office Action mailed Jul. 30. 2010", 4 Pgs.
Davis, Leroy, "Interface Between Data Terminal Equipment and Data Circuit Terminating Equipment Employing Serial Binary Data Interchange", EIA-232 Bus, [Online]. Retrieved from the Internet: <URL: www.interfacebus.com/Design_Connector_RS232.html>, (Jul. 2, 2006), 1-6.
"U.S. Appl. No. 09/492,913, Examiners Answer to Appeal Brief mailed Aug. 5, 2008", 32 pgs.
"U.S. Appl. No. 10/842,346, PTO Response to 312 Amendment mailed Feb. 1, 2010", 2 pgs.
"U.S. Appl. No. 11/087,081, Examiner Interview Summary mailed Oct. 26, 2006", 3 pgs.
"U.S. Appl. No. 11/857,283, Final Office Action mailed Mar. 18, 2011", 16 pgs.
"U.S. Appl. No. 11/857,283, Final Office Action mailed Aug. 31, 2011", 18 pgs.
"U.S. Appl. No. 11/857,283, Non Final Office Action mailed Jan. 11, 2012", 16 pgs.
"U.S. Appl. No. 11/857,283, Notice of Allowance mailed Jun. 22, 2012", 8 pgs.
"U.S. Appl. No. 11/857,283, Response filed Apr. 11, 2012 to Non Final Office Action mailed Jan. 11, 2012", 10 pgs.
"U.S. Appl. No. 11/857,283, Response filed Jun. 20, 2011 to Final Office Action mailed Mar. 18, 2011", 10 pgs.
"U.S. Appl. No. 11/857,283, Response filed Nov. 30, 2011 to Final Office Action mailed Aug. 31, 2011", 10 pgs.
"U.S. Appl. No. 12/553,857, Supplemental Notice of Allowability mailed Feb. 7, 2011", 4 pgs.
"Australian Application No. 2007216810, First Examiner Report Response filed Mar. 30, 2011", 3 pgs.
"Canadian Application No. 2,601,662, Office Action mailed Apr. 20, 2011", 4 pgs.
"Canadian Application No. 2,601,662, Office Action mailed Sep. 11, 2011", 5 pgs.
"Canadian Application No. 2,601,662, Response filed Aug. 29, 2011 to Office Action mailed Apr. 20, 2011", 13 pgs.
"Chinese Application No. 200710186183.0, Office Action mailed Feb. 24, 2011", 7 pgs.
"Chinese Application No. 200710186183.0, Office Action mailed Mar. 29, 2012", With English Translation, 20 pgs.
"Chinese Application No. 200710186183.0, Office Action mailed Sep. 5, 2012", 22 pgs.
"Chinese Application No. 200710186183.0, Office Action Received May 6, 2011", 8 pgs.
"Chinese Application No. 2007101861830, Response filed Aug. 3, 2012 to Office Action mailed Mar. 19, 2012", CN Response Only, 8 pgs.
"European Application No. 05252864.3, European Office Action mailed May 18, 2011", 5 pgs.
"European Application No. 05252864.3, European Office Action Response Filed Sep. 5, 2011", 2 pages.
"European Application No. 07253666.7, response filed Mar. 29, 2011 to Office Action mailed Nov. 26, 2010", 21 pgs.
"Module: Definition from Answers.com", Computer Desktop Encyclopedia. TechEncyclopedia. Computer Language Company, Inc, [Online]. Retrieved from the Internet: <URL: http://www.answers.com/topic/module>, 9 pgs.
"Notice of Opposition to European Patent No. 1252799 filed Jul. 5, 2012", 31 pgs.
"Response filed Feb. 25, 2013 to Notice of European Patent No. 1252799", 18 pgs.
Ristola, Jorma, "Mobility in Internet", S-38.130 Licentiate Course on Telecommunications Technology, (Oct. 22, 1996), 10 pgs.

* cited by examiner

HEARING AID SYSTEMS

RELATED APPLICATIONS

This application is a Continuation of U.S. application Ser. No. 09/492,913 filed Jan. 20, 2000, now abandoned which is incorporated herein by reference.

TECHNICAL FIELD

The present invention relates generally to hearing aid systems. More particularly, it pertains to fitting, programming, or upgrading hearing aid systems.

BACKGROUND INFORMATION

Sound systems can be broken down into three general components: an input device (such as a microphone); a processing system (such as a digital signal processor); and an output device (such as a speaker). Sounds are picked up by the microphone, transmitted to the processing system where they are processed, and then projected by the speaker so that the sounds can be heard at an appropriate distance.

The described sound systems may include a hearing aid device. The hearing aid device serves a patient by picking up desired sounds, processing them, and projecting them into the ear of the patient to facilitate communications. The processing system of the hearing aid device is adjusted to fit a specific patient.

Adjustment of hearing aid devices to fit a patient is laborious and time intensive. An audiologist who is engaged in the fitting of hearing aid devices must, during a session with a patient, have on hand not only hearing aid devices from different manufacturers, but also equipment to adjust the different hearing aid devices. The equipment includes proprietary programming hardware and software, interface hardware, and connector cables from these different manufacturers. The process of reconnecting different interface hardware and connector cables renders the fitting experience frustrating for both the audiologist and the patient.

What has also been frustrating is that there is a lack of a reliable method to ensure that the software on the hearing aid devices or the programming hardware is current. An updated version of software may have been released, but this updated software often does not get installed. This may be due to miscommunications, forward incompatibility between older equipment and newer software, procrastination, or perhaps it is because the audiologist was not trained to maintain a complicated software system. This problem prevents a patient from benefiting from newer software.

Thus, what is needed are systems, methods, and structures to fit, program, or upgrade hearing aid systems.

SUMMARY

The above-mentioned problems with hearing aid systems as well as other problems are addressed by the present invention and will be understood by reading and studying the following specification. Systems, methods, and structures are described which address the problems of programming hearing aid systems.

One illustrative embodiment includes a method. The method includes programming a hearing aid system using at least one wireless communication protocol.

Another illustrative embodiment includes a method for tailoring an audiological therapy for a patient. The method includes deriving at least one audiological parameter by obtaining data about at least one aural response of the patient, and programming a hearing aid system based on the at least one audiological parameter by a mobile device so as to tailor an audiological therapy for the patient.

Another illustrative embodiment includes a business method. The business method includes deriving at least one audiological parameter by obtaining data about at least one aural response of a patient, upgrading a piece of software capable of executing on the hearing aid system based on the at least one audiological parameter, wherein upgrading includes downloading the software by a mobile device. The business method further comprises charging for upgrading the software in the hearing aid system.

Another illustrative embodiment includes a system. The system comprises a hearing aid system and a mobile device adapted to program the hearing aid system. The system further comprises a server adapted to communicate with the mobile device. The system further comprises at least one network to facilitate communications at least among the hearing aid system, the mobile device, and the server.

These and other embodiments, aspects, advantages, and features of the present invention will be set forth in part in the description which follows, and in part will become apparent to those skilled in the art by reference to the following description of the invention and drawings or by practice of the invention.

DETAILED DESCRIPTION

Figure 1:
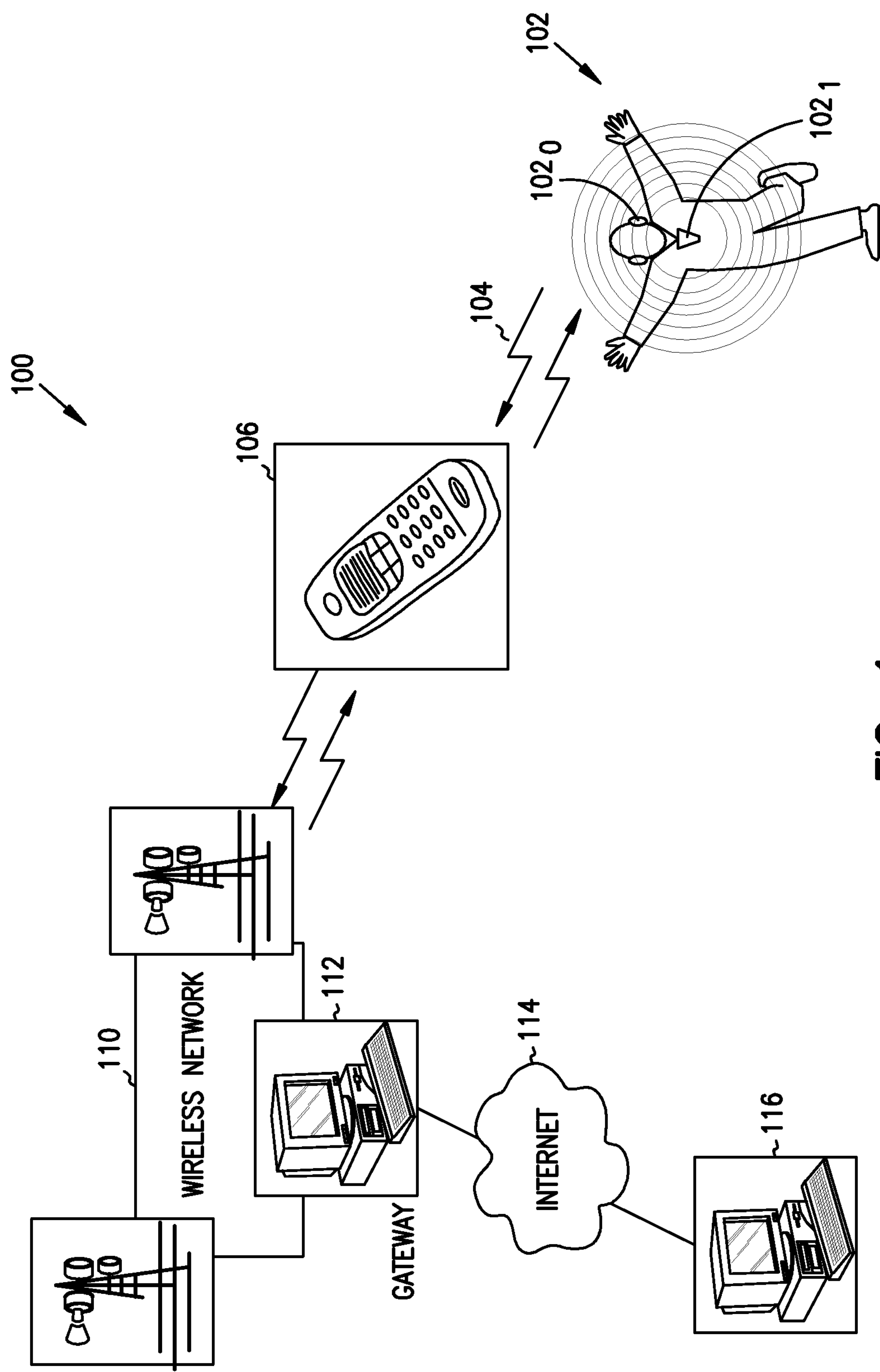
FIG. 1 is a pictorial diagram illustrating a system in accordance with one embodiment.

In the following detailed description of the invention, reference is made to the accompanying drawings that form a part hereof, and in which are shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

The embodiments described herein focus on, among other things, programming hearing aid systems. One component of a hearing aid system includes a processing system. The processing system provides audio signal processing. The audio signal processing includes audiological parameters that may be adjusted so as to enhance the sense of hearing for a patient. This adjustment of the audiological parameters is a tailoring of an audiological therapy for a specific patient.

In tailoring, the patient is tested to obtain aural responses to various conditions. These responses are then used to determine which audiological parameters to adjust as well as the ranges of audiological parameter values that may be adjusted. Different brands of hearing aid may have different audiological parameters. This process of adjustment may be considered a programming of the hearing aid system.

Such programming of the hearing aid system may be accomplished using wireless information technology. Information technology has grown at an unprecedented rate as a result of the synergistic marriage of communication networks and the computer. Milestones in the development of these communication networks have included the wired telephone networks, radio, television, cable, cellular networks, and communication satellites. Computers have made dramatic progress from being hulking machines with human operators to today's postage-stamp-size integrated circuits. The merging of the communication networks and the computer has replaced the model of forcing workers to bring their work to the machine with a model of allowing anyone to access information on any computers at diverse locations and times.

The programming of hearing aid systems can leverage from that synergy of communication networks and the computer. One consequence of the execution of the described embodiments is that a professional can focus on his/her main task—providing the best audiological therapy to a patient through a hearing aid system—and not focus on managing a complicated software or programming system. The term professional means the inclusion of anyone, such as an audiologist, who is capable and qualified for providing professional services related to providing audiological therapy. This is possible because the embodiments provide the appropriate software and information at the instant they are needed by the professional. In yet other embodiments, diagnostics and adjustment can be made without the immediate presence of a professional. In one embodiment, such diagnostics and adjustment is initiated by a patient. Because of the ability of the patient to initiate remote communication with either a professional or to the central server that comprises an expert system trained in providing audiological therapy, the patient can benefit from diagnostics and adjustments to the hearing aid system even without the presence of a professional. In another embodiment, the diagnostics and adjustment is initiated by the remote server. The following embodiments discuss that and other concepts.

FIG. 1 is a pictorial diagram illustrating a system in accordance with one embodiment. The system 100 includes a hearing aid system 102 that is adapted to wear by a person. The hearing aid system 102 is capable of audio signal processing. Such an audio signal processing system can be used, for example, to tailor the hearing aid system 102 to provide an appropriate audiological therapy for a specific patient. In one embodiment, the hearing aid system 102 comprises a hearing aid device $\mathbf{102}_0$. In this embodiment, the hearing aid system 102 may comprise a digital signal processor that is capable of accepting different generations of software. In another embodiment, the hearing aid device $\mathbf{102}_0$ is capable of digital audio compression and decompression.

In another embodiment, the hearing aid system 102 comprises a hearing aid device $\mathbf{102}_0$ and a programming module $\mathbf{102}_1$. The programming module $\mathbf{102}_1$ is communicatively coupled to the hearing aid device $\mathbf{102}_0$. The term communicatively coupled means the inclusion of wireless coupling or wired coupling. In one embodiment, the hearing aid device $\mathbf{102}_0$ and the programming module $\mathbf{102}_1$ are each capable of digital audio compression and decompression. In another embodiment, the programming module $\mathbf{102}_1$ is capable of sending a test signal to the hearing aid device $\mathbf{102}_0$ so as to test for at least one aural response of the patient. In another embodiment, the programming module $\mathbf{102}_1$ includes a headset. In another embodiment, the programming module $\mathbf{102}_1$ is adapted to provide Bluetooth wireless connectivity, signal processing, and power for programming of the hearing aid device $\mathbf{102}_0$. In one embodiment, the programming module $\mathbf{102}_1$ is adapted to be worn around the patient's neck, or integrated into a headset or eyeglass fixture.

The hearing aid system 102 can communicate bi-directionally via a short-range network 104. In one embodiment, the short-range network is a pico-cellular network. In another embodiment, the short-range network includes a network occupying an un-licensed frequency-band. In one embodiment, the short-range network 104 includes wired networking. In another embodiment, the short-range network 104 includes a wireless short-range network such as a radio transmission network or an optical transmission network. One implementation of the radio transmission network includes Bluetooth technology. Bluetooth technology provides a short-range, low-cost radio communication link. Bluetooth may be used to replace wired cables that connect peripherals to this sample of equipment: cellular phones, audio headsets, computer laptops, personal digital assistants, digital cameras, etc. Another implementation of the radio transmission network includes HomeRF, DECT, PHS, or Wireless LAN (WLAN), or other equivalent proprietary wireless communications protocols that do not depart from the present invention.

An optical transmission network provides short-range wireless connectivity for line-of-sight applications. This type of network includes the Infrared Data Associate (IrDA) protocol.

The hearing aid system 102 can communicate with a device 106 facilitated by the short-range network 104. In various embodiments, the device 106 includes a mobile device or a terminal. The term "mobile device" means the inclusion of a digital cellular telephone, a personal digital assistant, a personal communication and information device. Furthermore, the term "mobile device" means the inclusion of a handheld device. The term "terminal" means the inclusion of a data terminal. The term "personal digital assistant" means the inclusion of a portable personal-computing device. The term "personal communication and information device" means the inclusion of a device capable of mobile communication as well as being capable of functioning as a personal digital assistant. In one embodiment, the device 106 can provide instructions to the hearing aid device $\mathbf{102}_0$ so as to tailor the audiological therapy, program existing software, or upgrade to new software. In another embodiment, the device 106 can provide instructions to the programming module $\mathbf{102}_1$ so as to tailor the audiological therapy, program existing software, or upgrade to new software. In another embodiment, the device 106 is adapted to store and execute a browser. The term browser means the inclusion of a software environment that is adapted to receive and execute distributed applications, such as applets. The device 106 is adapted to use data service protocol such as General Packet Radio Service (GPRS), High-Speed Circuit-Switched Data Service (HSCSD), Enhanced Data Rate for GSM Evolution (EDGE), Integrated Services Digital Network (ISDN), Universal Mobile Telecommunications System (UMTS), or Cellular Digital Packet Data (CDPD). In one embodiment, the data service protocol can be a wireless data service protocol.

The device 106 can communicate bi-directionally via a long-range wireless network 110. In one embodiment, the long-range wireless network includes cellular network. In another embodiment, the long-range wireless network includes a paging network. In another embodiment, the long-range wireless network includes a multimedia communications network. In another embodiment, the long-range wireless network 110 includes wireless technologies such as Global System for Mobile Communications (GSM), Code Division Multiple Access-One (cdmaOne), Time Division Multiple Access (TDMA), PDC, Japan Digital Cellular (JDC), Universal Mobile Telecommunications System (UMTS), Code Division Multiple Access-2000 (cdma2000), and Digital Enhanced Cordless Telephony (DECT).

A gateway 112 is communicatively coupled to the long-range wireless network 110. The term gateway is understood to mean the inclusion of a device that connects networks using different communications protocols so that information can be passed from one network to the other without incompatibility.

The gateway 112 connects Internet 114 to the long-range wireless network 110. In one embodiment, the term Internet means the inclusion of a worldwide collection of networks and gateways that use the TCP/IP suite of protocols to communicate with one another. In another embodiment, the term Internet means the inclusion of Internet2.

A server 116 is coupled to the Internet 114. In one embodiment, the server 116 is adapted to communicate with the device 106 through the Internet 114 and the long-range wireless network 110. In one embodiment, the device 106 is adapted to synchronize data with the server, such as the personal digital assistant. In another embodiment, the device 106 is adapted to receive an upgraded audiological software from the server 116. In one embodiment, the server 116 includes a database that includes patient data and audiological data associated with at least one type of hearing aid system. The server 116 stores a number of distributed applications, such as Java applications. The term Java application means the inclusion of a Java applet. The term distributed application means the inclusion of an object that can be distributed through mechanisms, such as Java-based distribution techniques, Common Object Request Broker Architecture (CORBA), or Component Object Model (COM). These distributed applications are adapted to interact with the hearing aid system 102.

In one embodiment, these distributed applications, such as a Java applet, are adapted to move from the server 116 to the device 106 to execute on the device 106. In another embodiment, once a distributed application is executed on the device 106, the device 106 may interact with the hearing aid system 102 through the user interface provided by the distributed application. In yet another embodiment, the distributed application when moved to the device 106 would dynamically plug into existing software that includes a user interface already on the mobile device.

When such distributed applications are executing on the device 106, the distributed applications are adapted to receive additional information from the server 116. Such distributed applications are also adapted to send information to the server 116 from the device 106.

In another embodiment, the server 116 receives from the device 106 a patient identification. Based on this patient identification, the server 116 accesses the patient's medical history and the information regarding the hearing device system being worn by the patient. Next, the server 116 calculates a best fit procedure to obtain programmable audiological parameters for the hearing aid system. These programmable audiological parameters are communicated to the mobile device 106 so as to allow a programming of the hearing aid system.

One of the various benefits of the heretofore described embodiments include allowing the professional to access the most relevant software and information to aid him/her in his/her task of providing the best audiological therapy through a hearing aid system for a patient. This is possible because the embodiments allow storage of the software and information on a central server. The professional can thus access the information anywhere he needs to be to provide professional services needed by the patient. Another benefits of the heretofore described embodiments include the upgrading of software in the processing component (not shown) of the hearing aid system 102.

Figure 2:
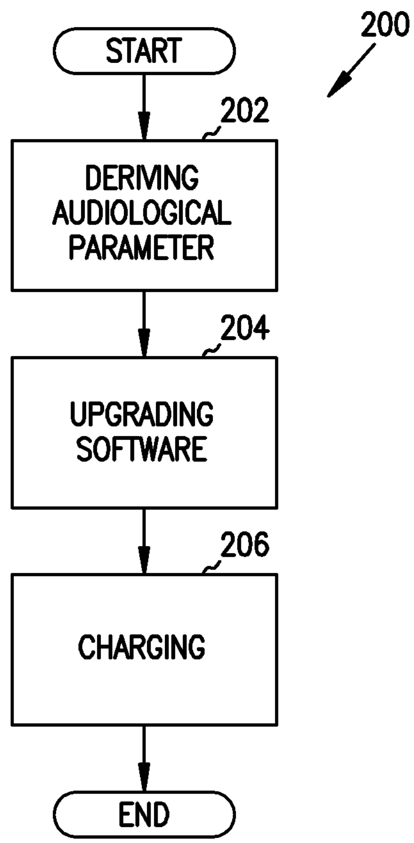
FIG. 2 is a process diagram illustrating a method in accordance with one embodiment.

FIG. 2 is a process diagram illustrating a method in accordance with one embodiment. Process 200 is a business method. At block 202, the process 200 includes deriving at least one audiological parameter by testing a patient to obtain at least one aural response. The term aural response means the inclusion of a result obtained by applying a series of tests on the patient; one test may include sending audio test signals and measuring the response of the patient to those audio test signals. Once sufficient aural responses are obtained, the business method derives at least one audiological parameter. The term audiological parameter means the inclusion of an adjustable parameter of an audio signal processing component of a hearing aid system; although certain audiological parameters are general and are available for adjustment across different types of hearing aid systems, other audiological parameter may be specific for a particular brand and made of a hearing aid system.

The process 200 includes upgrading software capable of executing on the hearing aid system. The upgrading of the software depends at least on the audiological parameter or audiological parameters that were derived in block 202. In one embodiment, such audiological parameters serve as an index into a database containing the appropriate software that can be used to upgrade existing software executing on the hearing aid system. In one embodiment, the database resides on a server. In one embodiment, the software stores in the database is adapted to be distributable. Such software is adapted to be downloadable to a mobile device that is communicatively coupled to the server. At least one network is engaged to facilitate the communication between the mobile device and the hearing aid system and the server.

The process 200 includes charging at block 206 for upgrading the software in the hearing aid system. Such charging includes identifying the patient, identifying the patient's health care insurance, identifying the type of hearing device worn by the patient, and identifying the type of therapy needed by the patient. The charging may be accomplished using a billable account or through a credit-card transaction.

Figure 3:
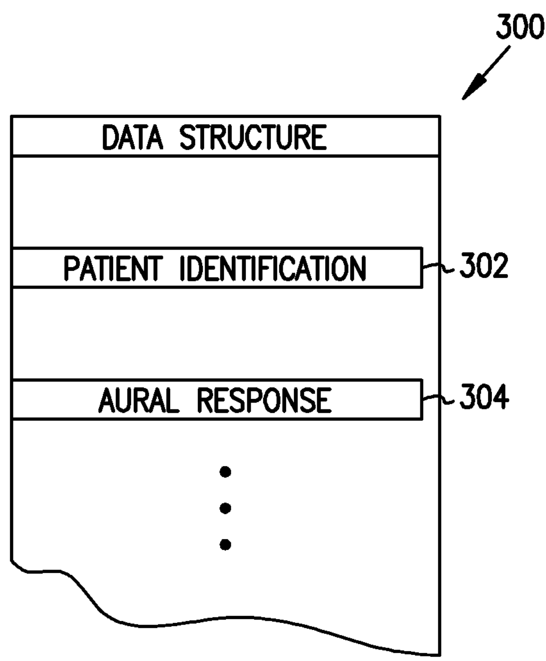
FIG. 3 is a structure diagram illustrating a data structure in accordance with one embodiment.

FIG. 3 is a structure diagram illustrating a data structure in accordance with one embodiment. The structure 300 includes a data structure to store a patient identification 302. The implementation of patient identification 302 includes using any type of data structure including a class or a structure. The structure 300 includes a data structure to store an aural response 304. The implementation of the aural response 304 includes using any type of data structure, such as an array or a linked list.

The structure 300 is adapted to be uploaded from a mobile device to a server through at least one network. In one embodiment, the structure 300 is adapted for tailoring an audiological therapy for the patient.

Figure 4:
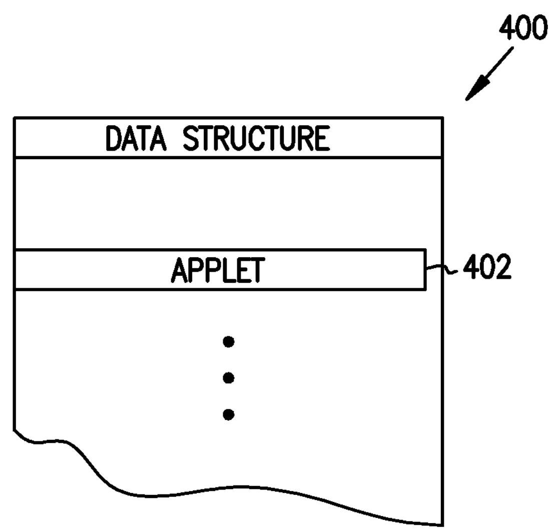
FIG. 4 is a structure diagram illustrating a data structure in accordance with one embodiment.

FIG. 4 is a structure diagram illustrating a data structure in accordance with one embodiment. The structure 400 includes a data structure to store a distributed application, such as an applet 402. The applet 402 is adapted to be executed on a device to interact with a hearing aid system so as to tailor an audiological therapy. The applet 402 is also adapted to be downloadable to a mobile device from a server on at least one type of network.

Figure 5:
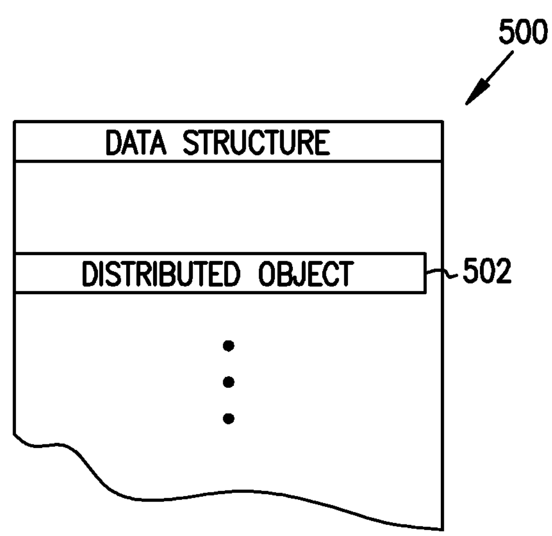
FIG. 5 is a structure diagram illustrating a data structure in accordance with one embodiment.

FIG. 5 is a structure diagram illustrating a data structure in accordance with one embodiment. The structure 500 includes a data structure to store a distributed application, such as a distributed object 502. The distributed object 502 is adapted to be executed on a device to interact with a hearing aid system so as to tailor an audiological therapy. The distributed object 502 is also adapted to be downloadable to a mobile device from a server on at least one type of network.

Figure 6:
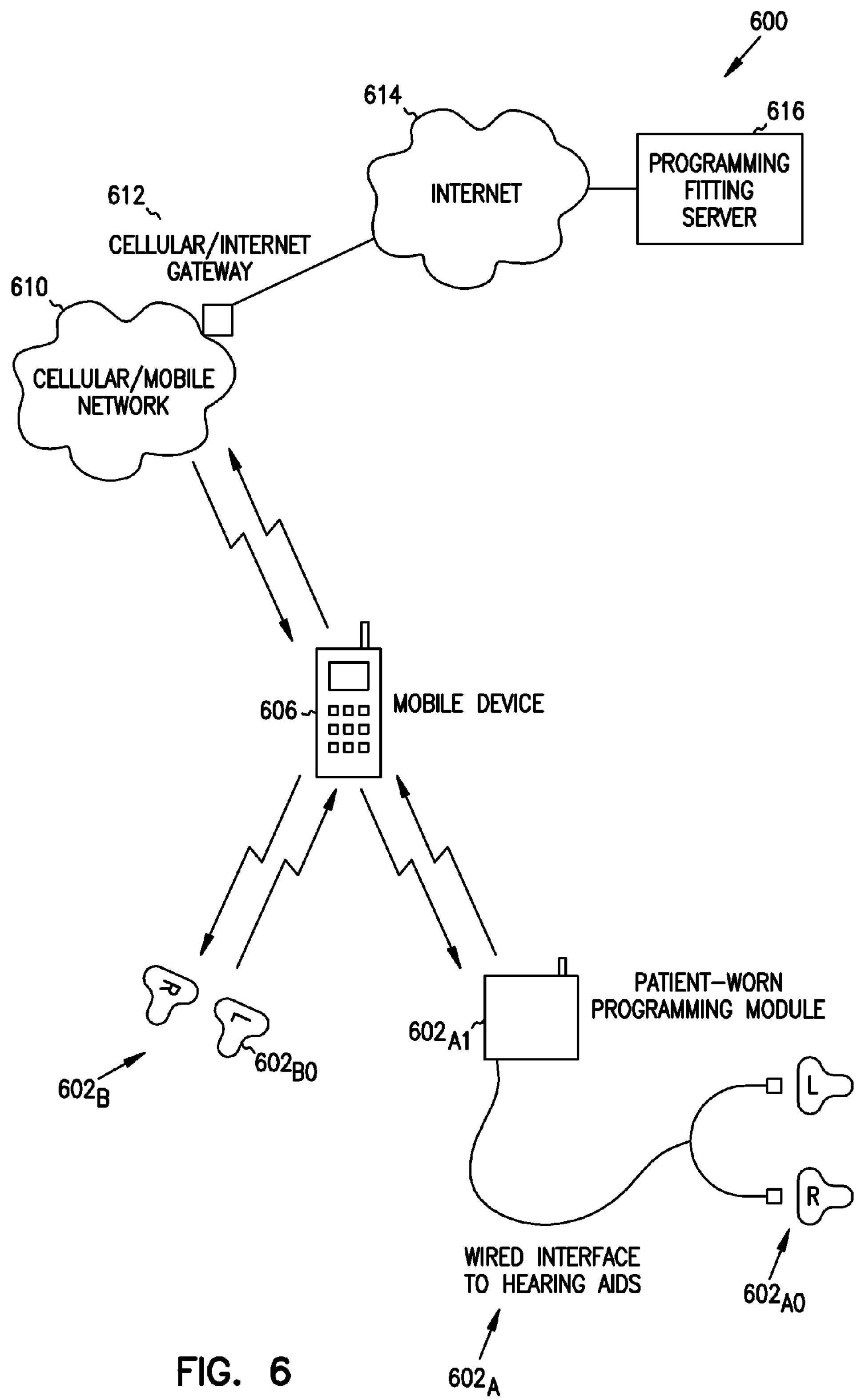
FIG. 6 is a pictorial diagram illustrating a system in accordance with one embodiment.

FIG. 6 is a pictorial diagram illustrating a system in accordance with one embodiment. FIG. 6 contains elements similar to those discussed in FIG. 1. For these elements, the aforementioned discussion related to them is incorporated here in full. The system 600 includes hearing aid systems $\mathbf{602}_A$ and $\mathbf{602}_B$. The hearing aid system $\mathbf{602}_A$ comprises a programming module $\mathbf{602}_{A1}$ and a hearing aid device $\mathbf{602}_{A0}$. The hearing aid system $\mathbf{602}_B$ comprises the hearing aid device $\mathbf{602}_{B0}$. Whereas a mobile device 606 communicates with the hearing aid device $\mathbf{602}_{A0}$ of the hearing aid system $\mathbf{602}_A$ through the programming module $\mathbf{602}_{A1}$, the mobile device 606 communicates directly with the hearing aid device $\mathbf{602}_{B0}$ of the hearing aid system $\mathbf{602}_B$.

For illustrative purposes only, suppose a patient is being fitted with the hearing aid system $\mathbf{602}_B$. During the fitting process, a piece of software may be executed on the mobile device 606 to interact with the patient wearing the hearing aid system $\mathbf{602}_B$. Such interaction includes sending audio test signals from the software executing on the mobile device 606 to the hearing aid system $\mathbf{602}_B$. Such software includes a user interface. The aural response from the patient is either automatically sent back to the testing software by the hearing aid system $\mathbf{602}_B$ or is recorded manually into the testing software through the mobile device 606. Once sufficient aural responses are collected, in one embodiment, such aural responses are sent to a programming fitting server 616 through the cellular/mobile network 610 and the Internet 614; in another embodiment, such aural responses are formatted to form an audiogram before sending the information to the programming fitting server 616. The term audiogram means the inclusion of profiling from the aural responses so as to obtain the extent of the hearing loss of the patient. The programming fitting server 616 derives at least one audiological parameter from the aural responses. Such audiological parameters are used to tailor an audiological therapy, to program existing audiological software, or to upgrade existing audiological software. For the purpose of this illustration, the programming fitting server 616 derives an adjustment to an audio signal processing component of the hearing aid system $\mathbf{602}_B$. Such adjustment incrementally tailors an audiological therapy provided by the hearing aid system $\mathbf{602}_B$ so that the hearing aid system $\mathbf{602}_B$ fits the patient.

The foregoing illustrative discussion is also applicable in an embodiment that includes the hearing aid system $\mathbf{602}_A$.

Figure 7:
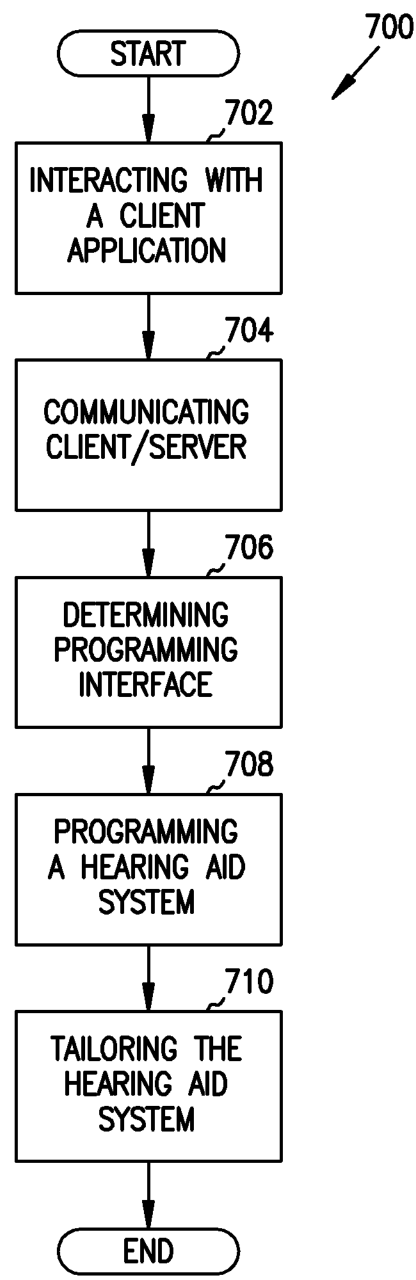
FIG. 7 is a process diagram illustrating a method in accordance with one embodiment.

FIG. 7 is a process diagram illustrating a method in accordance with one embodiment. Process 700 includes, at block 702, interacting with a client application that is executing on a mobile device. In one embodiment, the mobile device is adapted to communicate using a wireless protocol or a Wireless Access Protocol. The term Wireless Access Protocol (WAP) means the inclusion of an open communications standard (protocol and mark-up language) designed to bring Internet access and other value-added services to a mobile device. WAP defines an application environment (mark-up and programming language) and an application protocol. The application protocol allows WAP applications to be downloaded to mobile devices on demand and removed when no longer in use.

The act of interacting includes entering an identification of a patient, entering an identification of a type of hearing aid system that is being fitted or worn by the patient, or recording aural responses of the patient to audio test signals.

The process 700 includes, at block 704, communicating with a server application that is executing on a server. In one embodiment, the server is coupled to the Internet. The client application is adapted to communicate with the server application through a long-range wireless network. The act of communicating includes uploading information gathered during the act of interacting, such as the identification of the patient. The act of communicating further includes communicating with the client application to download information such as a programming interface.

The process 700 includes, at block 706, determining at least one programming interface to program the hearing aid system. The act of determining includes using at least the type of the hearing aid system to derive the programming interface. The term programming interface means the inclusion of an application programming interface for a specific type of hearing aid system; the application programming interface includes a set of audiological parameters that may be adjusted so as to fit the hearing aid system to the patient.

The process 700 includes, at block 708, programming the hearing aid system. The act of programming includes adjusting the set of audiological parameters through the application programming interface. The act of programming may also include downloading new software to replace the existing software in the hearing aid system. The act of programming may further include downloading an incremental upgrade to the existing software in the hearing aid system.

The process 700 includes, at block 710, tailoring the hearing aid system to the patient by adjusting at least one programming interface by the client application. The act of tailoring includes the incremental adjustment of the hearing aid system so that the hearing aid system fits the patient.

The foregoing discussion is also applicable to an embodiment where a client application is executing on a terminal.

Figure 8:
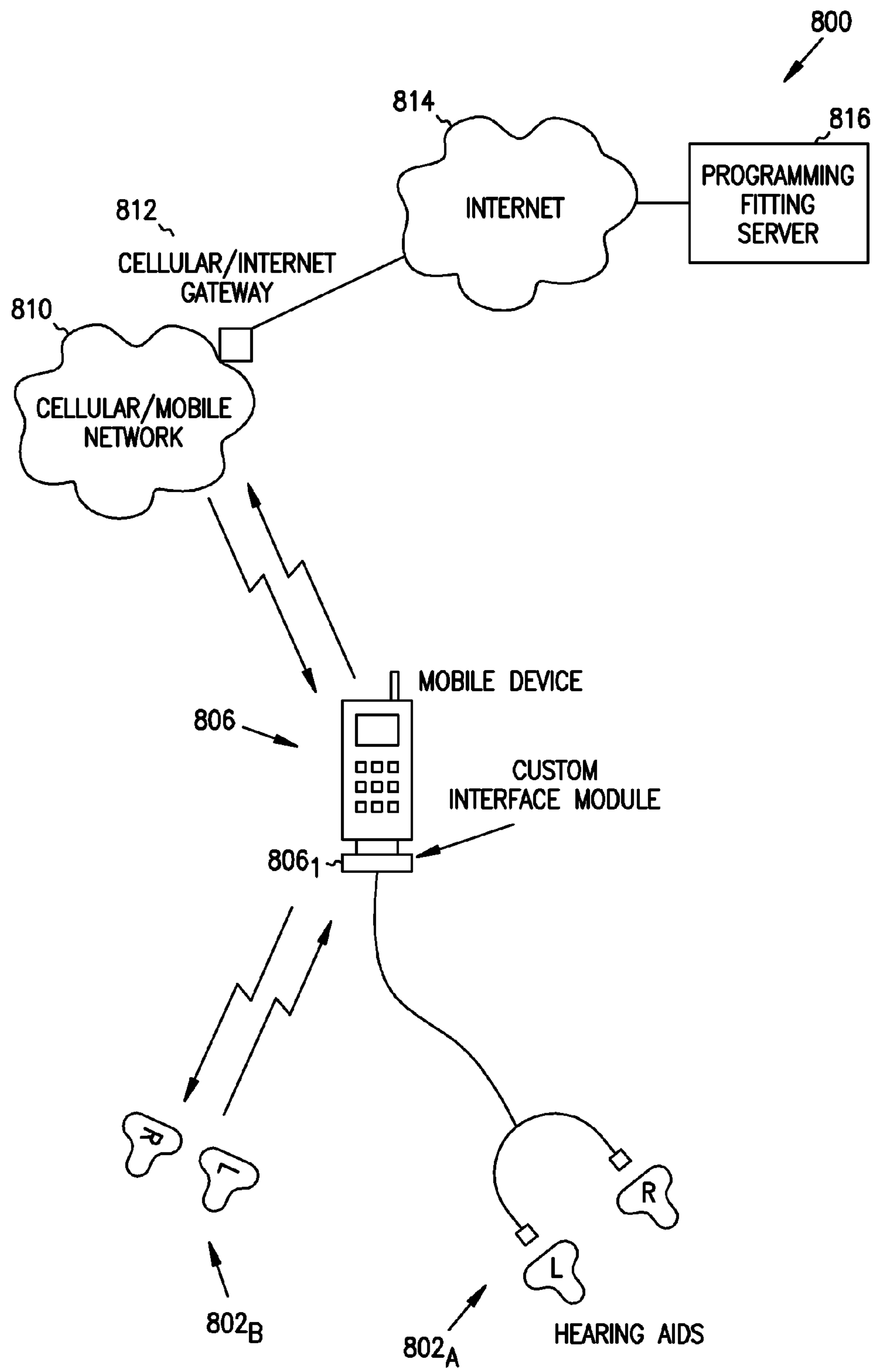
FIG. 8 is a pictorial diagram illustrating a system in accordance with one embodiment.

FIG. 8 is a pictorial diagram illustrating a system in accordance with one embodiment. FIG. 8 contains elements similar to those discussed in FIGS. 1 and 6. The aforementioned discussion of those similar elements is incorporated here in full. System 800 includes a custom interface module $\mathbf{806}_1$. The custom interface module $\mathbf{806}_1$ is adapted to be communicatively coupled to the mobile device 806. In one embodiment, the custom interface module $\mathbf{806}_1$ is adapted to be wirelessly communicable with the hearing aid system $\mathbf{802}_B$. In another embodiment, the custom interface module $\mathbf{806}_1$ is adapted to be wiredly communicable with the hearing aid system $\mathbf{802}_A$. Such custom interface module $\mathbf{806}_1$ may be implemented using Bluetooth technology or other equivalent technologies to provide a proprietary wireless interface directly to the hearing aid systems 802$_A$ or 802$_B$. One implementation of the customer interface module 806$_1$ includes using a serial or data port (not shown) of the mobile device 806.

In various embodiments, a client application executing on the mobile device 806 can interact with the hearing aid systems 802$_A$ or 802$_B$ through the custom interface module 806$_1$. The client application may be in communication with a server application executing on a programming fitting server 816 through an Internet 814, gateway 812, and cellular/mobile network 810.

Figure 9:
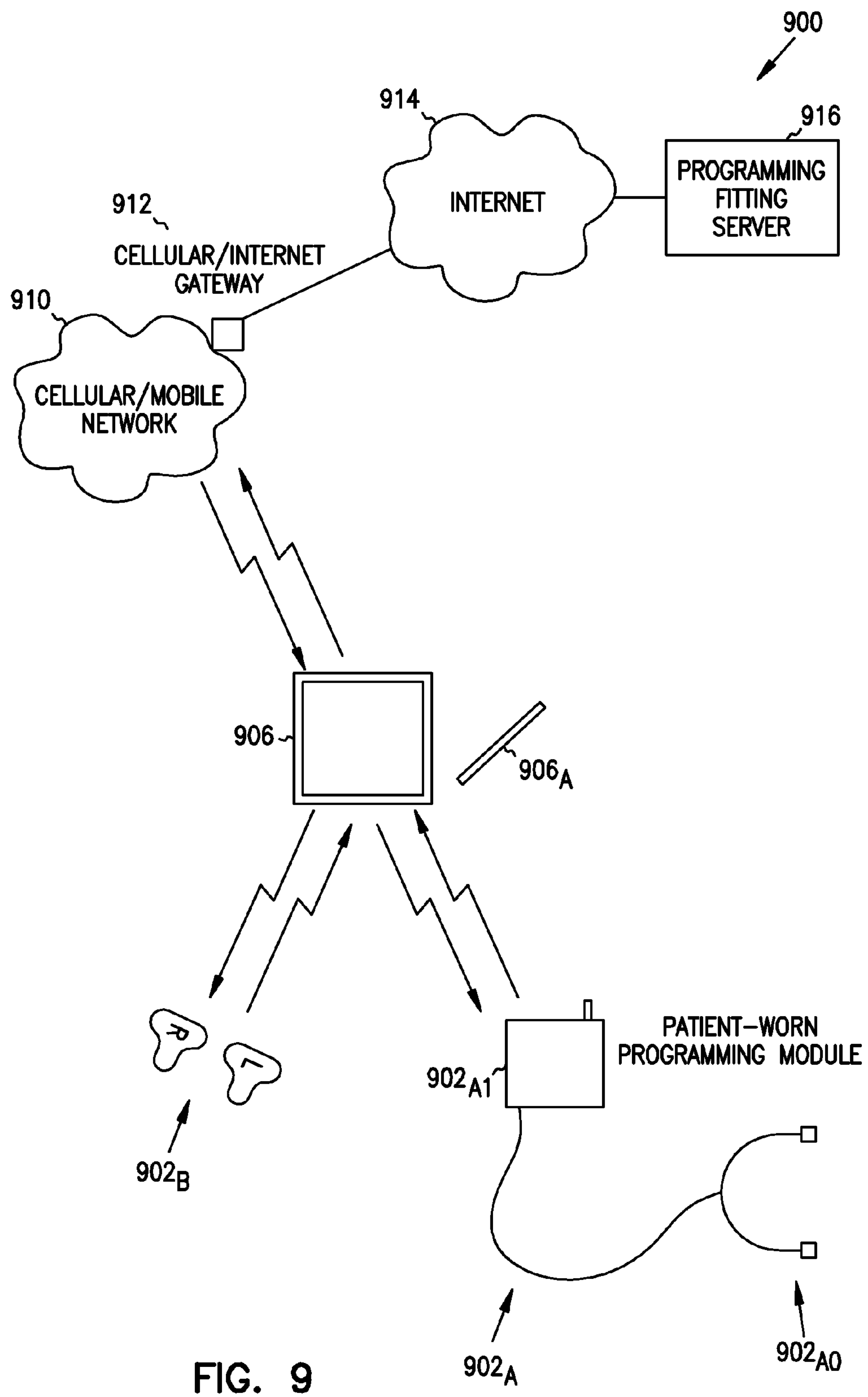
FIG. 9 is a pictorial diagram illustrating a system in accordance with one embodiment.

FIG. 9 is a pictorial diagram illustrating a system in accordance with one embodiment. FIG. 9 contains elements similar to those discussed in FIGS. 1, 6, and 8. The aforementioned discussion of those elements is incorporated here in full. System 900 includes a personal communication and information device (PCID) 906 or a personal digital assistant with wireless communication capability. In one embodiment, the PCID 906 is adapted to communicate wirelessly using technology such as Bluetooth or IrDA. The PCID 906 includes a pen 906$_A$. The pen 906$_A$ is an inputting device adapted to interact with the user interface of the PCID 906.

In various embodiments, the PCID 906 is adapted to communicate with hearing aid systems 902$_A$ or 902$_B$ using a short-range wireless network. The hearing aid system 902$_A$ includes a hearing aid device 902$_{A0}$ and a programming module 902$_{A1}$. The PCID 906 is also adapted to communicate with a programming fitting server 916. Such communication may occur over a cellular/mobile network 910, gateway 912, and Internet 914.

In any embodiments that include the PCID 906, the PCID 906 can send audio test signals to the hearing aid systems 902$_A$ or 902$_B$. Such audio test signals are compressed before transmission. Once these compressed audio test signals are received by either the hearing aid systems 902$_A$ or 902$_B$, the audio test signals are decompressed. These test signals are then presented to the patient. In yet any other embodiments that include the PCID 906, the PCID 906 can send instructions to the hearing aid systems 902$_A$ or 902$_B$. Based on the instructions, the hearing aid systems 902$_A$ or 902$_B$ generates the audio test signals using its audio signal processing capability.

Figure 10:
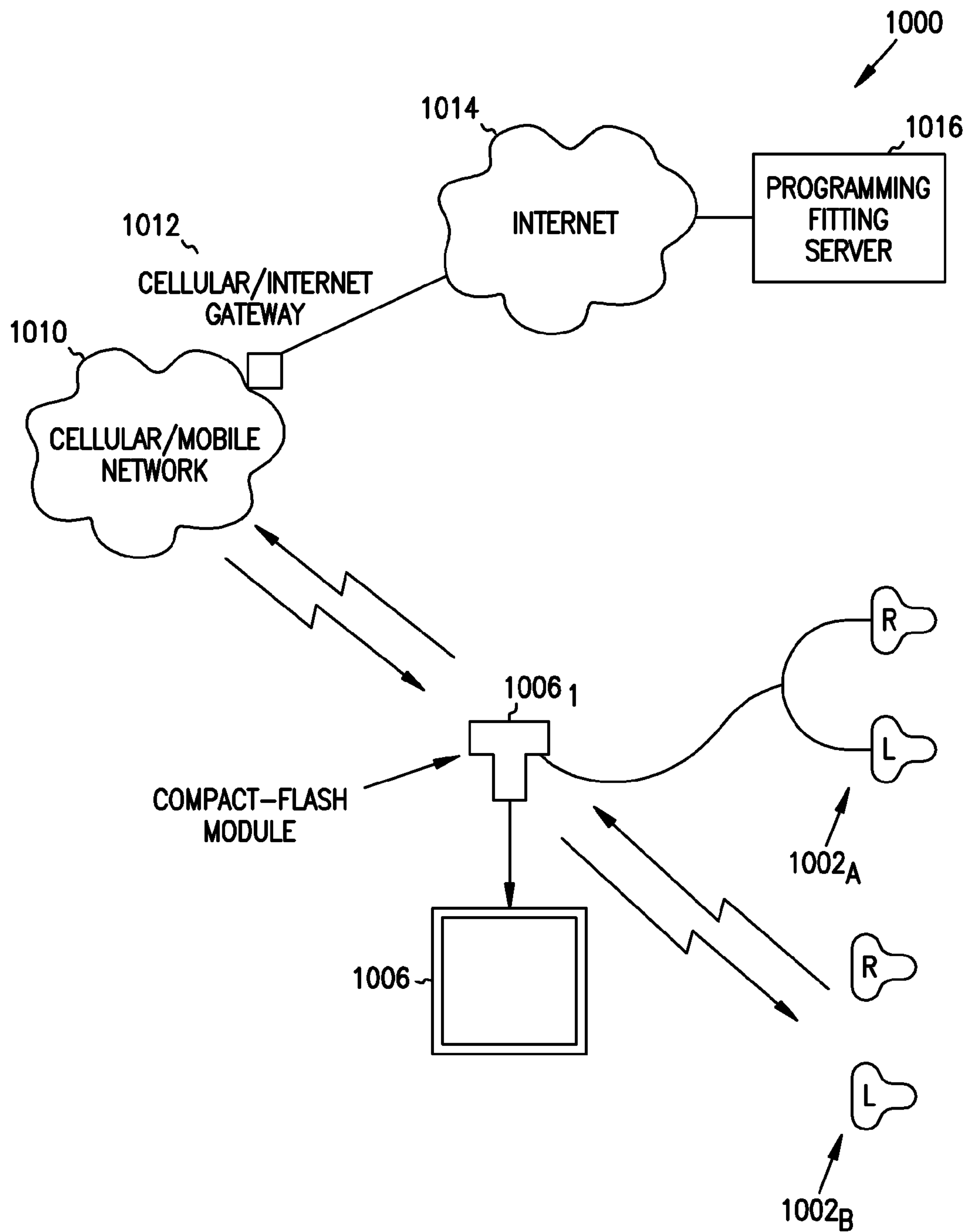
FIG. 10 is a pictorial diagram illustrating a system in accordance with one embodiment.

FIG. 10 is a pictorial diagram illustrating a system in accordance with one embodiment. FIG. 10 contains elements similar to those discussed in FIGS. 1, 6, 8, and 9. The aforementioned discussion of those elements is incorporated here in full. System 1000 includes a personal communication and information device (PCID) 1006 or a personal digital assistant with wireless communication capability. In one embodiment, the PCID 1006 includes a PCMIA module. In another embodiment, the PCID 1006 includes a CompactFlash module 1006$_1$. The CompactFlash module 1006$_1$ is communicatively coupled to hearing aid systems 1002$_A$ and 1002$_B$. In one embodiment, the CompactFlash module 1006$_1$ is implemented using short-range wireless technology, such as Bluetooth. In another embodiment, the CompactFlash module 1006$_1$ is adapted to be used even when the PCID 1006 lacks short-range wireless ability. The PCID 1006 is also adapted to communicate with a programming fitting server 1016. Such communication may occur over a cellular/mobile network 1010, gateway 1012, and Internet 1014.

Figure 11:
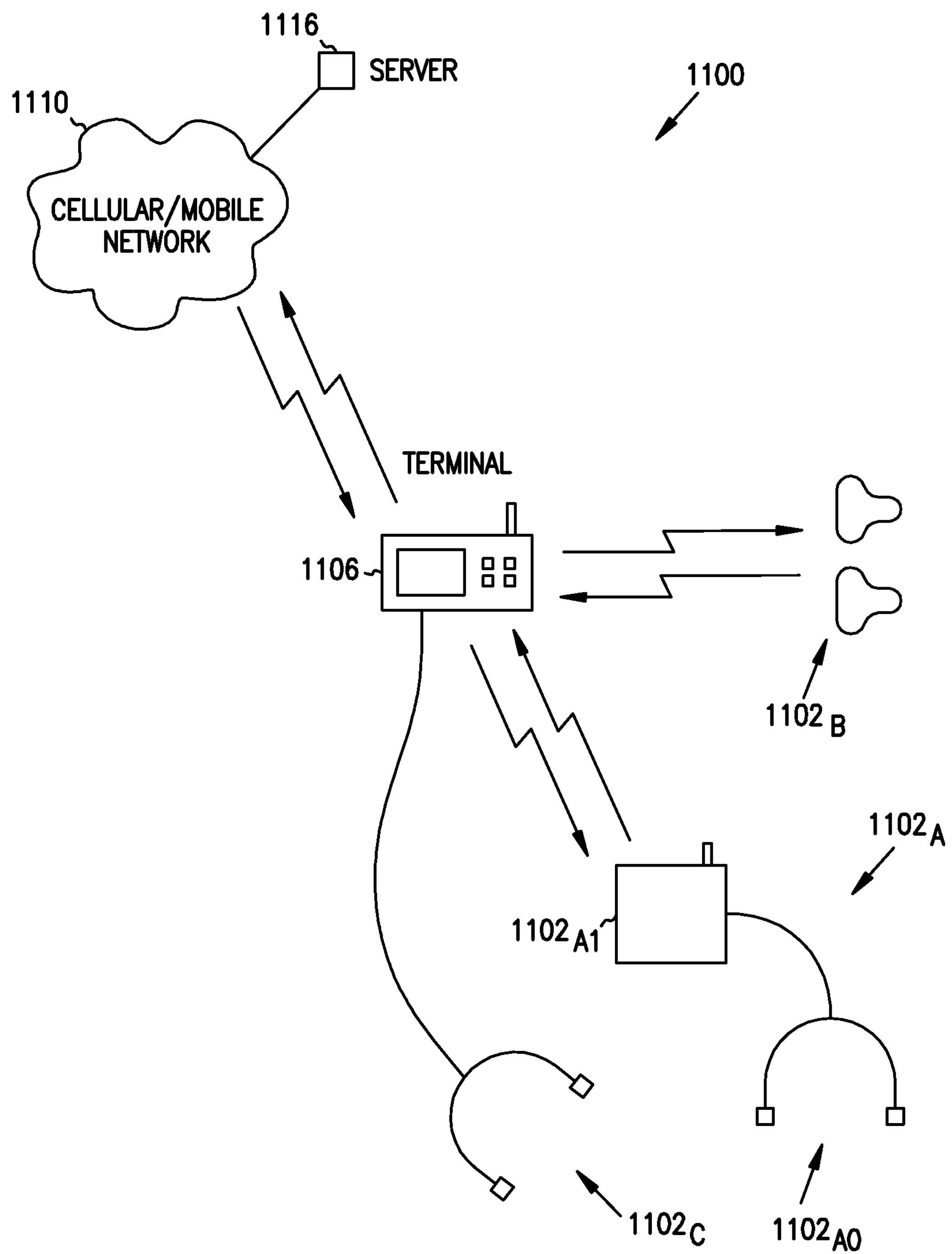
FIG. 11 is a pictorial diagram illustrating a system in accordance with one embodiment.

FIG. 11 is a pictorial diagram illustrating a system in accordance with one embodiment. FIG. 11 contains elements similar to those discussed in FIGS. 1, 6, 8, 9, and 10. The aforementioned discussion of those elements is incorporated here in full. System 1100 includes a terminal 1106. The term terminal means the inclusion of a data terminal. In one embodiment, the terminal 1106 is adapted to use a data service protocol such as General Packet Radio Service (GPRS), High-Speed Circuit-Switched Data Service (HSCSD), Enhanced Data Rate for GSM Evolution (EDGE), Integrated Services Digital Network (ISDN), Universal Mobile Telecommunications System (UMTS), or Cellular Digital Packet Data (CDPD).

The terminal 1106 is adapted to communicate with hearing aid systems 1102$_A$, 1102$_B$, and 1102$_C$ through at least one short-range network. In various embodiments, the short-range network includes a radio communication network such as Bluetooth, an optical communication network such as Infrared Data Association (IrDA) protocol, or a wired communication network. In one embodiment, the short-range network is a wireless network.

In various embodiments, the hearing aid systems 1102$_A$, 1102$_B$, and 1102$_C$ include a hearing aid device. In various embodiments, the hearing aid systems 1102$_A$, 1102$_B$, and 1102$_C$ are adapted to be capable of audio signal processing. In various embodiments, the hearing aid systems 1102$_A$, 1102$_B$, and 1102$_C$ are adapted to be capable of digital audio compression and decompression. The hearing aid system 1102$_A$ includes a hearing aid device 1102$_{A0}$ and a programming module 1102$_{A1}$. The programming module 1102$_{A1}$ is adapted to communicate with the hearing aid device 1102$_{A0}$ so as to receive at least one programming instruction from the terminal 1106 to program the hearing aid device 1102$_{A0}$. In all embodiments described above and below, the hearing aid system 1102$_A$ may include a headset. The headset is capable of detecting and communicating ambient information to a server application so as to provide additional information to fit, program, or upgrade the audiological software of the hearing aid system 1102$_A$. In another embodiment, the programming module 1102$_{A1}$ is implemented as a headset. The programming module 1102$_{A1}$ is adapted to be capable of sending a test audio signal to the hearing aid so as to test at least one aural response of a patient.

The terminal 1106 is also adapted to communicate wirelessly using a long-range wireless network 1110. In various embodiments, the long-range wireless network includes various wireless technologies such as Global System for Mobile Communications (GSM), Code Division Multiple Access-one (cdmaOne), Time Division Multiple Access (TDMA), PDC, Universal Mobile Telecommunications System (UMTS), Code Division Multiple Access-2000 (cdma2000), and Digital Enhanced Cordless Telephony (DECT).

The terminal 1106 is adapted to communicate with a server 1116 through the long-range wireless network 1110. The server 1116 contains distributed applications, such as a distributed object that is adapted to interact with hearing aid systems 1102$_A$, 1102$_B$, and 1102$_C$. The distributed object is adapted to move from the server 1116 to the terminal 1106 so as to execute on the terminal 1106 to interact with the hearing aid systems 1102$_A$, 1102$_B$, and 1102$_C$. In one embodiment, the distributed object can receive information from the server 1116 and can transmit information to the server 1116. In one embodiment, the terminal 1106 includes a software environment, such as a browser, that is capable of receiving a distributed object. Such a distributed object can execute on the terminal 1106 so as to interact with the hearing aid systems 1102$_A$, 1102$_B$, and 1102$_C$. In a further embodiment, the server 1116 includes a database that includes patient data and audiological data associated with at least one type of hearing aid system. In one embodiment, the terminal 1106 is a customized or application specific device.

Figure 12:
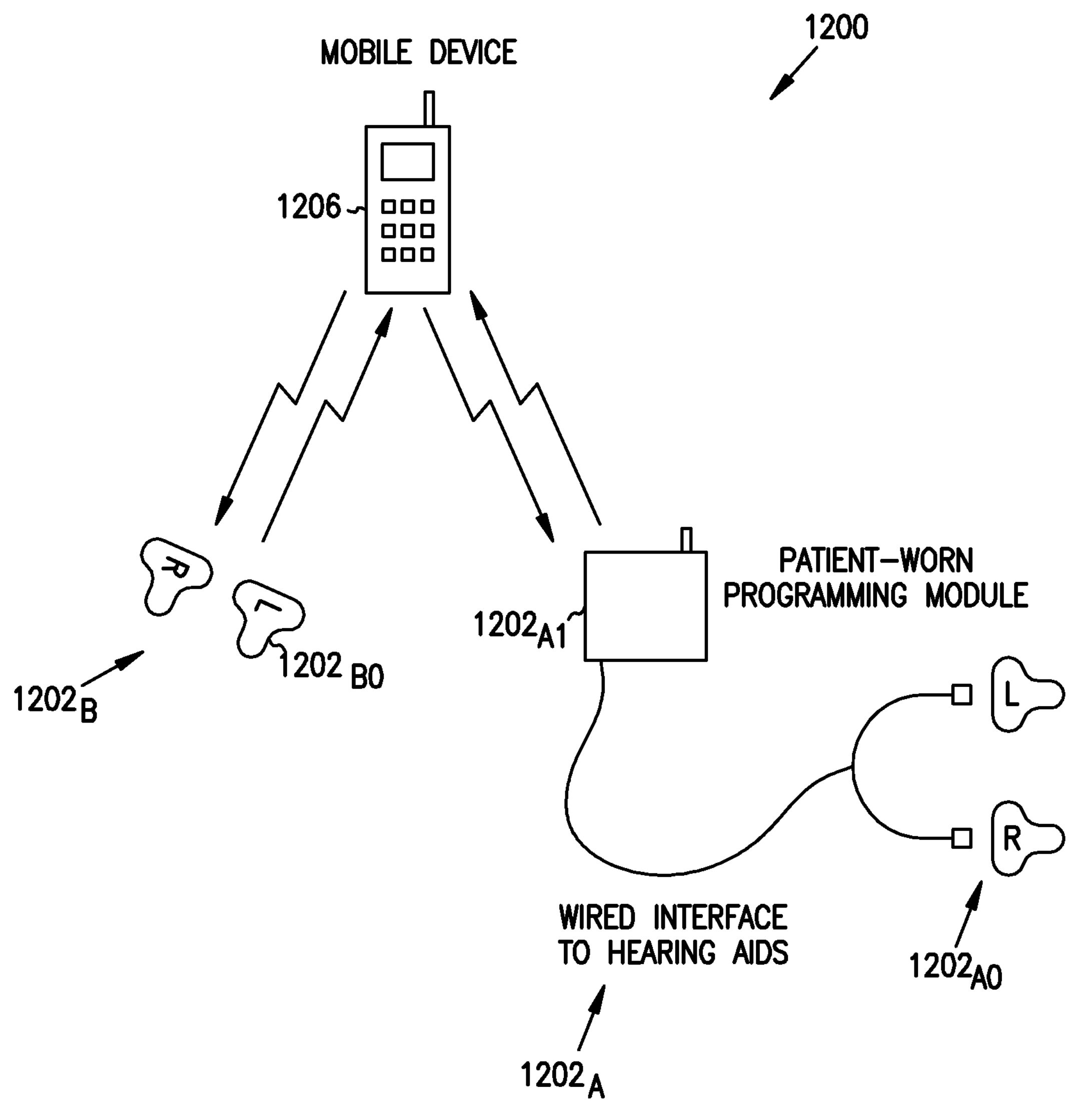
FIG. 12 is a pictorial diagram illustrating a system in accordance with one embodiment.

FIG. 12 is a pictorial diagram illustrating a system in accordance with one embodiment. FIG. 12 contains elements similar to those discussed in FIG. 6. For these elements, the aforementioned discussion related to them is incorporated here in full. The system 1200 includes hearing aid systems $\mathbf{1202}_A$ and $\mathbf{1202}_B$. The hearing aid system $\mathbf{1202}_A$ comprises a programming module $\mathbf{1202}_{A1}$ and a hearing aid device $\mathbf{1202}_{A0}$. The hearing aid system $\mathbf{1202}_B$ comprises the hearing aid device $\mathbf{1202}_{B0}$. Whereas a mobile device 1206 communicates with the hearing aid device $\mathbf{1202}_{A0}$ of the hearing aid system $\mathbf{1202}_A$ through the programming module $\mathbf{1202}_{A1}$, the mobile device 1206 communicates directly with the hearing aid device $\mathbf{1202}_{B0}$ of the hearing aid system $\mathbf{1202}_B$.

In this embodiment, the mobile device 1206 contains all the software and information to interact with either hearing aid systems $\mathbf{1202}_A$ and $\mathbf{1202}_B$ without having to interact with a server. In such embodiment, the mobile device 1206 can derive at least one audiological parameter from the aural responses obtained from the patient. As previously discussed, such audiological parameters are used to tailor an audiological therapy, to program existing audiological software, or to upgrade existing audiological software.

Figure 13:
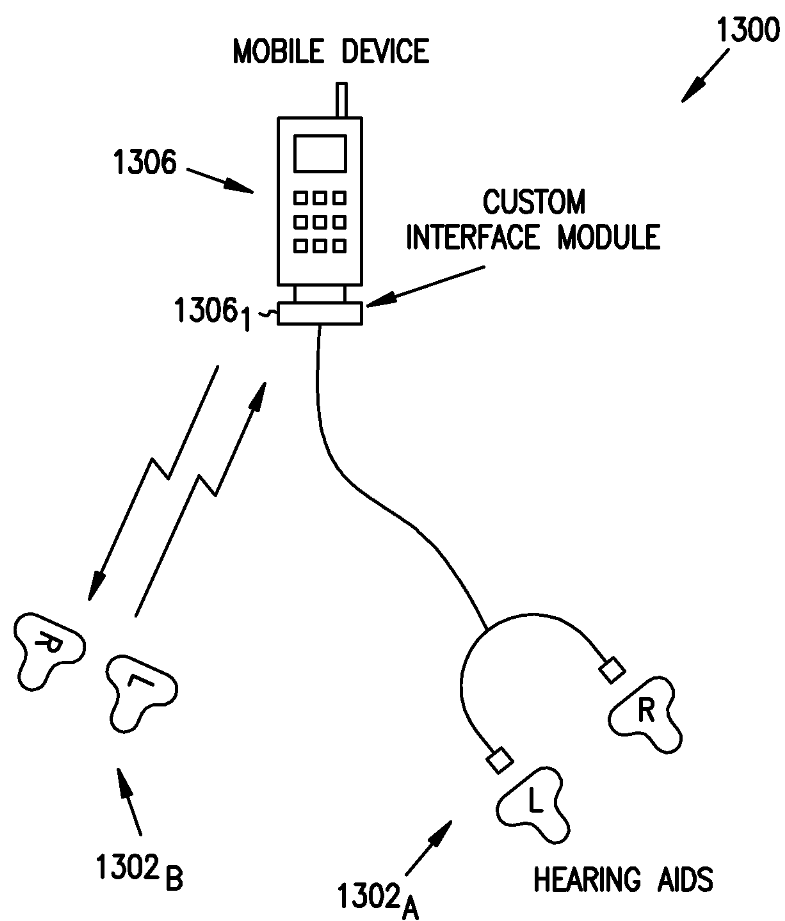
FIG. 13 is a pictorial diagram illustrating a system in accordance with one embodiment.

FIG. 13 is a pictorial diagram illustrating a system in accordance with one embodiment. FIG. 13 contains elements similar to those discussed in FIG. 8. The aforementioned discussion of those similar elements is incorporated here in full. System 1300 includes a custom interface module $\mathbf{1306}_1$. The custom interface module $\mathbf{1306}_1$ is adapted to be communicatively coupled to the mobile device 1306. In one embodiment, the custom interface module $\mathbf{1306}_1$ is adapted to be wirelessly communicable with the hearing aid system $\mathbf{1302}_B$. In another embodiment, the custom interface module $\mathbf{1306}_1$ is adapted to be wiredly communicable with the hearing aid system $\mathbf{1302}_A$.

In this embodiment, both the client and server applications reside on the mobile device 806. Thus, the mobile device 806 does not necessarily need to interact with a server.

Figure 14:
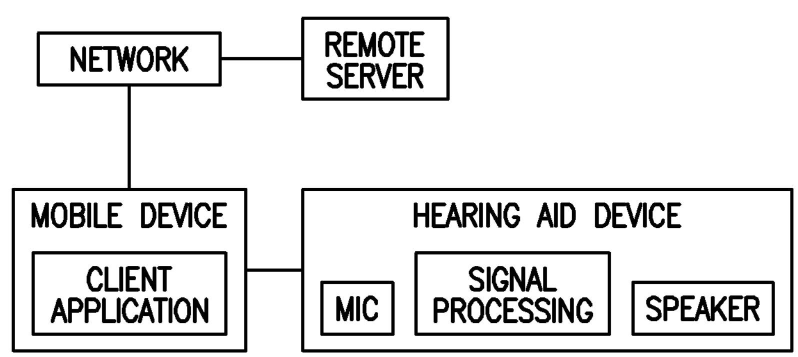
FIG. 14 illustrates an embodiment of a system that includes a hearing aid device, a mobile device and a remote server.

FIG. 14 illustrates an embodiment of a system that includes a hearing aid device, a mobile device and a remote server. The mobile device is adapted to use packets of data to communicate with a remote server through a network. The hearing aid device is adapted to be worn by a user. The hearing aid device includes a microphone, a speaker, and a signal processing system connected to the microphone and the speaker. A client application is adapted to operate on the mobile device to communicate packetized data with the hearing aid device and the remote server. The client application is adapted to use at least one digital communication protocol to digitally communicate packetized data.

CONCLUSION

Thus, systems, devices, structures, and methods have been described for fitting, programming, or upgrading hearing aid systems. In the embodiments where wireless communication is used, the processes of fitting, programming, and upgrading hearing aid systems may avoid the frustration of prior process due to the myriad of programming equipment. The equipment used in the described processes may benefit from running the most recent and relevant version of software. The equipment may also benefit from the ability to process data remotely or synchronizing of data. Professionals who are engaged in these processes may benefit from the ability to access a central database to store information as well as access patient and account information. Also, by leveraging the economy of scale offered by wireless information technology, the embodiments provide a solution that is low cost. This is the case because wireless information technology is often built into mass-marketed mobile devices such as a cellular telephone.

Although the specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

We claim:

1. A system, comprising:

a mobile device adapted to use packets of data to communicate with a remote server through a network that includes an Internet connection, wherein the Internet connection is used to communicate between the mobile device and the remote server;

a hearing aid device adapted to be worn by a user, the hearing aid device including a microphone, a speaker, and a signal processing system connected to the microphone and the speaker; and a client application adapted to operate on the mobile device to communicate packetized data between the hearing aid device and the remote server, wherein the client application is adapted to use at least one digital communication protocol to digitally communicate packetized data, wherein the hearing aid device is adapted to receive digital audio in packets of data within a digital signal transmitted from the mobile device using a digital communication protocol, to decompress the digital audio, and to generate an audible signal from the speaker, wherein the audio signal is representative of the digital audio.

2. The system of claim 1, wherein the hearing aid device is adapted to compress the digital audio.

3. The system of claim 1, wherein the hearing aid device and the mobile device are both adapted to compress and decompress the digital audio.

4. The system of claim 1, wherein the packets of data include packets of digital audio.

5. The system of claim 4, wherein the packets of digital audio include ambient information for the hearing aid device, the server includes a server application to receive the ambient information for use to adjust audiological parameters for the signal processing system of the hearing aid device.

6. The system of claim 1, further comprising a wired communication link between the mobile device and the hearing aid device.

7. The system of claim 1, further comprising a wireless communication link between the mobile device and the hearing aid device.

8. The system of claim 7, wherein the wireless communication link includes a picocellular network.

9. The system of claim 7, wherein the wireless communication link includes a radio transmission network.

10. The system of claim 9, wherein the radio transmission network uses a Bluetooth digital wireless protocol.

11. The system of claim 9, wherein the radio transmission network includes a wireless local area network (WLAN).

12. The system of claim 7, wherein the wireless communication link includes an optical transmission network.

13. The system of claim 1, wherein the network used to communicate between the mobile device and the remote server includes a wireless network and the Internet connection.

14. The system of claim 13, wherein the wireless network includes a cellular network.

15. The system of claim 13, wherein the wireless network includes a paging network.

16. The system of claim 13, wherein the wireless network includes a multimedia communications network.

17. The system of claim 13, wherein the mobile device is adapted to access the Internet connection through the wireless network.

18. The system of claim 1, wherein the remote server includes a programming fitting server adapted to derive an adjustment for an audio signal processing component in the signal processing system of the hearing aid device.

19. The system of claim 1, wherein the hearing aid device is adapted to wirelessly communicate with the mobile device, the hearing aid includes parameters, and the mobile device is adapted to adjust parameters of the hearing aid device.

20. A method performed using a system that includes a mobile device, a hearing aid device adapted to be worn by a user, and a client application adapted to operate on the mobile device, the method comprising:

using the client application operating on the mobile device, communicating packetized data between the hearing aid device and a remote server through a network that includes an Internet connection, wherein the Internet connection is used to communicate between the mobile device and the remote server, wherein:

the hearing aid device includes a microphone, a speaker, and a signal processing system connected to the microphone and the speaker, and communicating packetized data includes using a digital communication protocol to digitally transmit a digital audio signal to the hearing aid device; and decompressing the digital audio signal and generating an audible acoustic signal from the speaker of the hearing aid device, wherein the audible acoustic signal is representative of the digital audio.

21. The method of claim 20, wherein communicating packetized data between the hearing aid device and the remote server includes transmitting packets of information through a wireless network and the Internet connection.

22. The method of claim 20, wherein communicating packetized data between the hearing aid device and the remote server includes transmitting the packets of data through a wired connection between the mobile device and the hearing aid device.

23. The method of claim 20, wherein communicating packetized data between the hearing aid device and the remote server includes transmitting the packets of data through a wireless connection between the mobile device and the hearing aid device.

24. The method of claim 20, wherein the remote server includes a programming fitting server, the method further comprising using the programming fitting server to derive an adjustment for an audio signal processing component in the signal processing system of the hearing aid device.

25. The method of claim 20, wherein communicating packetized data between the hearing aid device and the remote server includes compressing and decompressing digital audio signals.

26. The method of claim 20, wherein communicating packetized data between the hearing aid device and the remote server includes providing instructions to the hearing aid device to tailor audiological therapy.

27. The method of claim 20, wherein communicating packetized data between the hearing aid device and the remote server includes providing instructions to the hearing aid device to program software.

28. The method of claim 20, wherein communicating packetized data between the hearing aid device and the remote server includes providing instructions to the hearing aid device to upgrade software.

29. A system, comprising:

a mobile device adapted to use packets of data to communicate with a remote server through a network that includes an Internet connection, wherein the Internet connection is used to communicate between the mobile device and the remote server;

a hearing aid device adapted to be worn by a user, the hearing aid device including a microphone, a speaker, and a signal processing system connected to the microphone and the speaker;

a client application adapted to operate on the mobile device to communicate packetized data between the hearing aid device and the remote server through a network wherein the mobile device and the hearing aid device are adapted to use a digital communication protocol to digitally transmit a digital audio signal in packets of data within a digital signal transmitted from the mobile device and receive the digital audio signal at the hearing aid device, and the hearing aid device is adapted to generate an audible signal from the speaker, wherein both the mobile device and the hearing aid device are adapted to compress and decompress digital audio, and wherein the audio signal is representative of the digital audio signal.

30. The system of claim 29, wherein:

the network used to communicate between the mobile device and the remote server includes a wireless network and an Internet connection; and the hearing aid device is adapted to communicate with the mobile device over a wireless communication link.

31. The system of claim 29, wherein the client application is adapted to operate on the mobile device to communicate with the remote server to receive programming information from the server and to communicate with the hearing aid device to adjust the hearing aid device using the programming information from the server.

32. The system of claim 29, wherein the hearing aid device is adapted to receive a test audio signal from the mobile device and generate a test sound from the speaker.

33. A system, comprising:

a mobile device configured with network communication capabilities, the mobile device adapted to use packets of digital data to communicate with a remote server through a network that includes an Internet connection, wherein the Internet connection is used to communicate between the mobile device and the remote server, wherein:

communication between the mobile device and the remote server includes Internet communication and communication through a wireless network, and the packets of digital data include destination information for use to route the packets of data through the network to the remote server;

a hearing aid device adapted to be worn by a user, the hearing aid device including a microphone, a speaker, and a signal processing system connected to the microphone and the speaker, and wherein the mobile device includes a client application adapted to operate on the mobile device to communicate packetized data between the hearing aid device and the remote server, wherein the client application is adapted to use at least one digital communication protocol to digitally communicate packetized data, and wherein the at least one digital communication protocol includes a Bluetooth digital wireless protocol, wherein the hearing aid device is adapted to receive digital audio in packets of data within a digital signal transmitted from the mobile device using a digital communication protocol, to decompress the digital audio, and to generate an audible signal from the speaker, wherein the audio signal is representative of the digital audio.

34. The system of claim 33, wherein the wireless network includes a cellular network.

35. The system of claim 33, wherein the mobile device is adapted to access the Internet connection through the wireless network.

36. The system of claim 33, wherein the remote server includes a programming fitting server adapted to derive an adjustment for an audio signal processing component in the signal processing system of the hearing aid device.

37. A method performed using a system that includes a mobile device, a hearing aid device adapted to be worn by a user, and a client application adapted to operate on the mobile device, the method comprising:

communicating packetized data between the hearing aid device and a remote server through a network that includes an Internet connection, wherein the Internet connection is used to communicate between the mobile device and the remote server, wherein communicating includes using the client application operating on the mobile device to provide packets of digital data for transmission to the remote server, wherein communicating between the hearing aid device and the remote server includes Internet communication and further includes transmitting packets through a wireless network, and wherein the packets of data include destination information for use to route the packets of digital data to the remote server;

wherein:

the hearing aid device includes a microphone, a speaker, and a signal processing system connected to the microphone and the speaker, and communicating packetized data includes using a Bluetooth digital communication protocol to digitally transmit a digital audio signal to the hearing aid device; and decompressing the digital audio signal and generating an audible acoustic signal from the speaker of the hearing aid device, wherein the audible acoustic signal is representative of the digital audio.

38. The method of claim 37, wherein the wireless network includes a cellular network.

39. The method of claim 37, wherein the mobile device is adapted to use the wireless network to obtain Internet access.

40. The method of claim 37, wherein the remote server includes a programming fitting server, the method further comprising using the programming fitting server to derive an adjustment for an audio signal processing component in the signal processing system of the hearing aid device.

* * * * *